US009817610B1

(12) United States Patent
Shallal et al.

(10) Patent No.: US 9,817,610 B1
(45) Date of Patent: Nov. 14, 2017

(54) HYBRID MEMORY SYSTEMS FOR AUTONOMOUS NON-VOLATILE MEMORY SAVE AND RESTORE OPERATIONS

(71) Applicant: INPHI CORPORATION, Santa Clara, CA (US)

(72) Inventors: Aws Shallal, Santa Clara, CA (US); Dan Kunkel, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 141 days.

(21) Appl. No.: 14/963,148

(22) Filed: Dec. 8, 2015

(51) Int. Cl.
  *G06F 12/00* (2006.01)
  *G06F 3/06* (2006.01)
  *G06F 12/02* (2006.01)

(52) U.S. Cl.
  CPC .......... *G06F 3/0659* (2013.01); *G06F 3/0619* (2013.01); *G06F 3/0656* (2013.01); *G06F 3/0685* (2013.01); *G06F 12/0238* (2013.01); *G06F 12/0246* (2013.01)

(58) Field of Classification Search
  CPC ............ G06F 12/0238; G06F 12/0246; G06F 3/0659; G06F 3/0619; G06F 3/0656; G06F 3/0685; G06F 3/0679
  See application file for complete search history.

(56) References Cited

U.S. PATENT DOCUMENTS

2010/0008175 A1* 1/2010 Sweere ............... G06F 12/0866
  365/229

OTHER PUBLICATIONS

"JEDEC Standard, DDR4 SDRAM", JEDEC Standard No. 79-4A (Revision of JESD79-4, Sep. 2012), Nov. 2013, pp. 1-208, JEDEC Solid State Technology Association.

* cited by examiner

*Primary Examiner* — Shawn X Gu
(74) *Attorney, Agent, or Firm* — Richard T. Ogawa; Ogawa P.C.

(57) ABSTRACT

An apparatus forms a memory system that is physically populated into a host. In a powered-on state, the apparatus logically connects to the host through a host memory controller configured to receive host-initiated commands. The memory system includes a command buffer coupled to the host memory controller to receive the host-initiated commands. The memory system comprises both volatile memory (e.g., RAM) and non-volatile memory (e.g., FLASH). A non-volatile memory controller (NVC) is coupled to the volatile memory, and is also coupled to the non-volatile memory. A command sequence processor that is co-resident with the NVC responds to a trigger signal by logically disconnecting from the host, then dispatching command sequences that perform successive read/write operations between the volatile memory and the non-volatile memory. The successive read/write operations are performed even when the host is in a powered-down state.

19 Claims, 26 Drawing Sheets

HYBRID MEMORY SYSTEMS FOR AUTONOMOUS NON-VOLATILE MEMORY SAVE AND RESTORE OPERATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of high-performance computing and more particularly to techniques for hybrid memory systems that perform autonomous non-volatile memory save and restore operations.

BACKGROUND

Semiconductor-based memory modules (e.g., DIMMS) often comport with some set of predetermined (e.g., standards-based) protocols for save and restore of volatile memory-resident data to and from, respectively, a non-volatile storage location so as to aid in protecting against catastrophic failures. Often some such predetermined protocols (e.g., as are sometime used on NVDIMM platforms) require a specific sequence of events to be carried out between a host component and NVDIMM components so as to initiate and complete a set of volatile memory save and/or restore operations.

In memory systems that comprise both volatile memory (e.g., random access memory (RAM)) and non-volatile memory components (e.g., solid state drive devices (SSD), FLASH memory devices, etc.), memory contents can be saved, and/or restored by moving memory contents between the two different types of memory components. Such volatile memory save and/or restore operations are often performed or facilitated by functions of an NVDIMM controller. Save and/or restore operations can be initiated either through use of software controlled registers and/or in response to hardware events.

Unfortunately, in legacy scenarios, a host is needed throughout the entirety of the performance of the save and/or restore operations. Legacy protocols rely on exchanges between the host and the memory subsystem. In legacy implementations, a large number of such exchanges need to be carried out, for example, to initiate an operation (e.g., a save operation) and then to bring the host components and memory subsystem components into a state suitable for performing a save and/or restore operation. In some such legacy implementations, the amount of time that is needed for the exchanges can become longer than the time available to process the save before actual occurrence of a catastrophic (e.g., complete power loss) event. For example, the time needed to bring the host components and memory subsystem components into a state suitable for performing a save/restore operation can easily be longer than the time between earliest detection of an impending catastrophic event (e.g., power brownout) and the actual occurrence of such a catastrophic event (e.g., total power outage). For this reason legacy implementations sometime fail to perform the intended save from volatile memory to non-volatile memory so as to protect against a catastrophic event.

None of the aforementioned legacy approaches achieve the capabilities of the herein-disclosed techniques for hybrid memory systems for autonomous non-volatile memory save and restore operations. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for hybrid memory systems for autonomous non-volatile memory save and restore operations. The claimed embodiments address the problem of performing fast saves of volatile memory to non-volatile locations before a catastrophic event. More specifically, some claims are directed to approaches for implement autonomous save and restore operations within a memory system that does not rely on a host during the save and restore operations, which claims advance the technical fields for addressing the problem of disaster recovery, as well as advancing peripheral technical fields. Some claims improve the functioning of multiple systems within the disclosed environments.

An apparatus forms a memory system that is physically populated into a host. In a powered-on state, the apparatus logically connects to the host through a host memory controller configured to receive host-initiated commands. The memory system includes a command buffer coupled to the host memory controller to receive the host-initiated commands. The memory system comprises both volatile memory (e.g., RAM) and non-volatile memory (e.g., FLASH). A non-volatile memory controller (NVC) is coupled to the volatile memory, and is also coupled to the non-volatile memory. A command sequence processor that is co-resident with the NVC responds to a trigger signal by logically disconnecting from the host, then dispatching command sequences that perform successive read/write operations between the volatile memory and the non-volatile memory. The successive read/write operations are performed even when the host is in a powered-down state.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
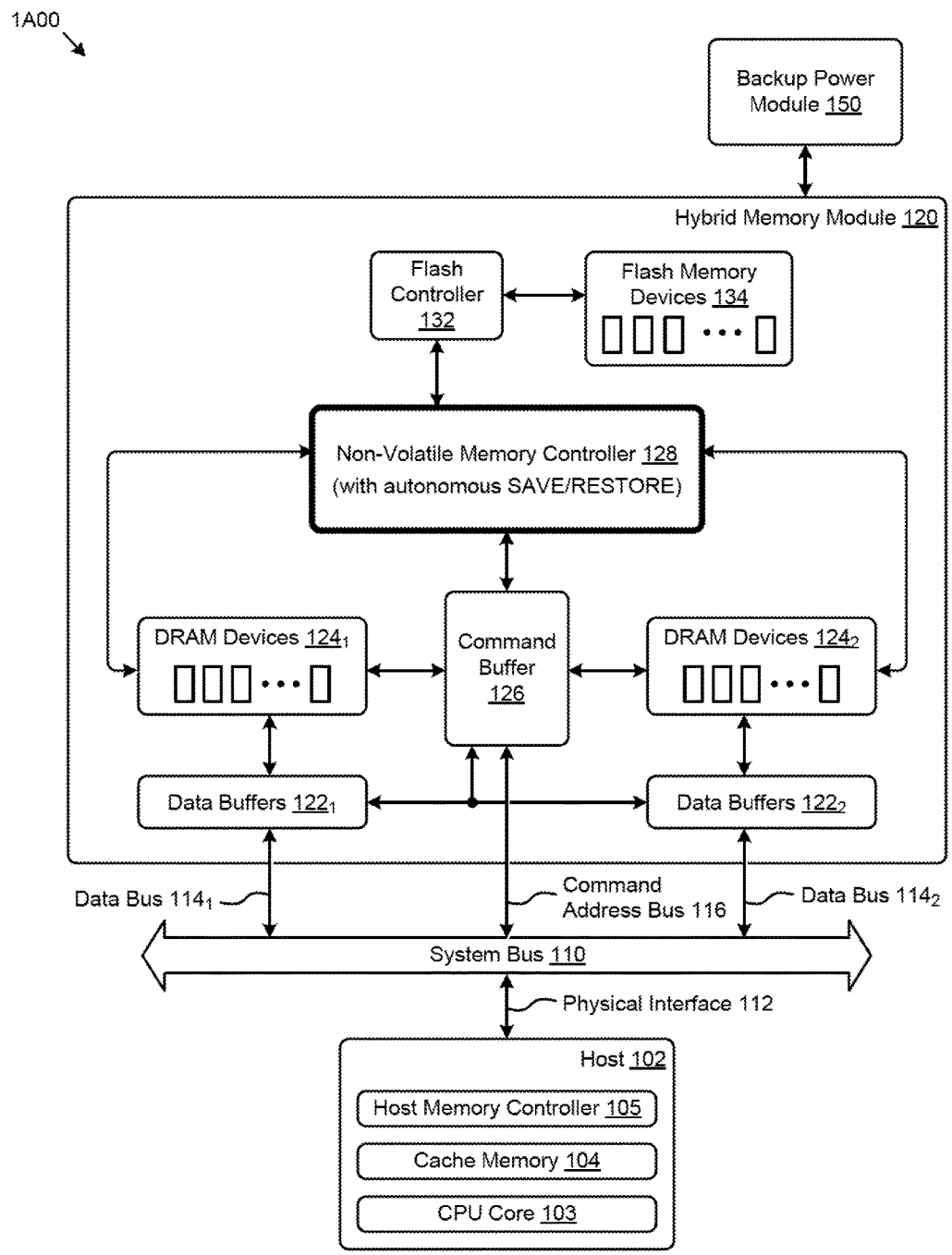
FIG. 1A exemplifies a host-based computing environment that uses both volatile memory and non-volatile memory.

Some embodiments of the present disclosure address the problem of performing fast saves of volatile memory to non-volatile locations before a catastrophic event and some embodiments are directed to approaches for implement autonomous save and restore operations within a memory system that does not rely on a host during the save and restore operations. More particularly, disclosed herein and in the accompanying figures are exemplary environments, methods, and systems for hybrid memory systems for autonomous non-volatile memory save and restore operations.

OVERVIEW

In legacy scenarios, a host is needed throughout the entirety of the performance of the save and/or restore operations. Legacy protocols rely on exchanges between the host and the memory subsystem. In legacy implementations, a large number of such exchanges need to be carried out, for example, to initiate an operation (e.g., a save operation) and then to bring the host components and memory subsystem components into a state suitable for performing a save and/or restore operation. In some such legacy implementations, the amount of time that transpires during the exchanges becomes longer than the time available to process the save before actual occurrence of a catastrophic (e.g., complete power loss) event. For example, the time needed to bring the host components and memory subsystem components into a state suitable for performing a save/restore operation can easily be longer than the time between earliest detection of an impending catastrophic event (e.g., power brownout) and the actual occurrence of such a catastrophic event (e.g., total power outage). For this reason legacy implementations sometime fail to perform the intended save from volatile memory to non-volatile memory so as to protect against a catastrophic event.

The techniques, protocols, and systems described herein serve to decouple the rigid interlocking protocols as used in legacy implementations (e.g., interlocking between a host and NVDIMM controller). In one embodiment an NVDIMM controller includes functionality so as to not only carry out host-initiated protocol exchanges of legacy techniques, but also the ability to operate autonomously even after a host failure. In some use cases, an NVDIMM controller intervenes autonomously on the DIMM (e.g., when an event such as a save event is raised) to carry out actions that cause a transfer (e.g., save) of DRAM data to persistent memory locations. Similarly, that same (or different) persistent memory can be restored to DRAM by the herein-disclosed NVDIMM controller. Such a restore can be invoked at any moment in time (e.g. based on host initiation of a restore).

Configurations of some of the herein-disclosed memory systems (e.g., hybrid memory modules) often comprise DRAM (e.g., volatile memory components), an NVDIMM controller (e.g., comprising sensors and logic components), and an area of persistent memory (e.g., solid state storage device components), which can be interconnected so as to form a memory system to be populated into a host such as a server or other computing platform. In operation, such a memory system can receive host commands from a host-based component such as a memory controller situated on the host. A command buffer is coupled to the host's memory controller to receive and store commands (for example host commands).

In addition to the host-based memory controller, the herein-disclosed memory systems include a non-volatile memory controller that is coupled to the same command buffer. When a particular event or type of event such as a power-down event is detected (e.g., autonomously by a memory system or by a received trigger signal from a host or by a received trigger signal originating from any other trigger source), the autonomous non-volatile memory controller (NVC) invokes one or more of a set of command sequences. A particular command sequence can invoke further command sequences and any one or more commands can be entered into the command buffer. The command sequences, and the commands that are entered into the command buffer, can depend on the particular event or type of event that was detected.

Many use cases are facilitated by the autonomous nature of the aforementioned memory system. For example, operation of components of the memory system (e.g., operation of the NVC) can implement the steps needed to perform specific save operations and/or specific restore scenarios. In some embodiments, unique communication sequences (e.g., LCOM sequences) can be programmed so as to implement specific save and restore operations as may be applicable in the host environment. The non-volatile memory controller is programmable using any of a variety of known-in-the-art techniques (e.g., load over serial lines, ROM, "flashing", etc.). The autonomous nature of the herein-described non-volatile memory controller together with the programmability of the non-volatile memory controller—so as to respond to various sensed events (e.g., an impending power-down event) and/or to respond to various stimuli (e.g., a host-initiated command)—offers the functionality needed to implement high-performance volatile memory saves and restores. Resilience of systems using such a memory system is enhanced. Save and restore sequences can be executed completely autonomously by the memory system without host intervention and without system BIOS changes.

Glossary

CSR: A control setting register.
NVC: A non-volatile memory controller.
NVDIMM: A dual-inline memory module comprising at least some non-volatile memory.
RCD: A registering clock driver.

As is further discussed below, and as shown in the accompanying figures, the inventive memory system can implement some or all of the below-listed capabilities. Specifically the inventive memory system can:

Autonomously disconnect from the host (e.g., by controlling RCD CSRs).
Autonomously monitor and control all SAVE/RESTORE steps and transitions (e.g., without reliance on or limitations of host-defined protocol requirements).
Perform any number of save/restore operations in accordance with a preprogrammed sequence and/or in accordance with autonomously-determined conditions and/or in accordance with a preprogrammed mixture of sequential operations and parallel operations.
Initiate and autonomously process instruction sequences that intervene on DIMMs (e.g., to initiate all NVDIMM data save procedures to move volatile memory to a persistent storage facility).
Initiate and autonomously process instruction sequences that intervene on DIMMs (e.g., to initiate all NVDIMM data restore procedures to move volatile memory to a persistent storage facility).
Accept and store program instructions to implement LCOM sequences (e.g., for specific save and restore scenarios that can occur within an NVDIMM, and to properly control the DIMM independent of a host).
Accept and store program instructions that enter command sequences into queuing structures for asynchronous execution.

In exemplary embodiments, all of, or any portions of, the capabilities mentioned above can be implemented in a programmable component that is integrated with memory (e.g., DIMMS) to form a highly resilient memory system to be used in conjunction with non-volatile storage devices. Such a memory system can be disconnected from a host, and moreover, such a memory system can make use of local clock signals (e.g., clock signals that originate from within the boundary of the memory system) so as to relieve dependence on a host-provided clock.

Further details regarding a general approach to design and implementation of hybrid memory modules are described in co-pending U.S. patent application Ser. No. 14/883,155, titled "HIGH-THROUGHPUT LOW-LATENCY HYBRID MEMORY MODULE", as well as in co-pending U.S. patent application Ser. No. 14/884,496, titled "HYBRID MEMORY MODULE WITH IMPROVED INTER-MEMORY DATA TRANSMISSION PATH", both of which are hereby incorporated by reference in their entirety.

Portions of the disclosure refer to various known-in-the-art memory characteristics, including acronyms (e.g., "DIMM", "SDRAM", "RCD", etc.), signal names (e.g., "LCOM", "LCK", etc.), and register names (e.g., "F4RC00", "F0RC0A", etc.). The discussions describe specific embodiments using certain terms of the art. Such discussions are provided without loss of generality of the scope of the disclosure as a whole.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

The term "logic" means any combination of software or hardware that is used to implement all or part of the disclosure.

The term "non-transitory computer readable medium" refers to any medium that participates in providing instructions to a logic processor.

A "module" includes any mix of any portions of computer memory and any extent of circuitry including circuitry embodied as a processor.

DESCRIPTIONS OF EXEMPLARY EMBODIMENTS

FIG. 1A exemplifies a host-based computing environment 1A00 that uses both volatile memory and non-volatile memory. The environment comprises a host 102 coupled to a hybrid memory module 120 through a system bus 110. The host 102 further comprises a CPU core 103, a cache memory 104, and a host memory controller 105. Host 102 can comprise multiple instances of CPU cores, cache memory 104, and host memory controller 105. The host 102 of the host-based computing environment 1A00 can further be based on various architectures (e.g., Intel x86, ARM, MIPS, IBM Power, etc.). Cache memory 104 can be dedicated to the CPU core 103 or shared with other cores. The host memory controller 105 of the host 102 communicates with the hybrid memory module 120 through the system bus 110 using a physical interface 112 (e.g., compliant with the JEDEC DDR4 SDRAM standard, etc.). Specifically, the host memory controller 105 can write data to and/or read data from a first set of DRAM devices 124₁ and a second set of DRAM devices 124₂ using a data bus 114₁ and a data bus 114₂, respectively. For example, the data bus 114₁ and/or the data bus 114₂ can transmit the data as electronic signals such as a data signal, a chip select signal, and/or a data strobe signal. The DRAM devices 124₁ and/or the DRAM devices 124₂ might each comprise an array of eight or nine DDR4 memory devices (e.g., SDRAM) arranged in various topologies (e.g., AB sides, single-rank, dual-rank, quad-rank, etc.). Other memory devices (e.g., DDR3 memory devices) can comprise the DRAM devices. In some cases, and as shown, the data to and/or from the DRAM devices 124₁ and/or the DRAM devices 124₂ can be buffered by a set of data buffers 122₁ and data buffers 122₂, respectively. Such data buffers can serve to boost the drive of the signals (e.g., data or DQ signals, etc.) on the system bus 110 to help mitigate high electrical loads of large computing and/or memory systems.

Further, commands from the host memory controller 105 can be received by a command buffer 126 (e.g., registering clock driver or RCD) at the hybrid memory module 120 using a command and address (CA) bus 116. For example, the command buffer 126 might be a registering clock driver (RCD) such as is included in registered DIMMs (e.g., RDIMMs, LRDIMMs, etc.). Command buffers such as command buffer 126 can comprise a logical register and a phase-lock loop (PLL) to receive and re-drive command and address input signals from the host memory controller 105 to the DRAM devices on a DIMM (e.g., DRAM devices 124₁, DRAM devices 124₂, etc.), thus reducing clock, control, command, and address signal loading by isolating the DRAM devices from the host memory controller 105 and the system bus 110. In some cases, certain features of the command buffer 126 can be programmed with configuration and/or control settings.

The hybrid memory module 120 shown in FIG. 1A further comprises a non-volatile memory controller 128 coupled to a flash controller 132 and a set of flash memory devices 134. The presence of the flash memory devices 134 (e.g., NAND flash memory chips) and the DRAM devices on a dual in-line memory module (DIMM), in part, defines the "hybrid" characteristic of the hybrid memory module 120, at least according to JEDEC. Such hybrid memory modules can be referred to as non-volatile DIMMs (NVDIMMs), and can appear as a DRAM DIMM to the system controller (e.g., host memory controller 105) and/or share a memory channel with other DRAM DIMMs. For example, JEDEC has identified three NVDIMM configurations as follows:

NVDIMM-N: A hybrid memory module consisting of DRAM made persistent through the use of flash memory. No flash memory beyond that needed for persistence operations (e.g., data backup, data restore, etc.) is accessible by the host memory controller.

NVDIMM-P: A hybrid memory module consisting of DRAM made persistent through the use of flash memory. Flash memory beyond that needed for persistence is accessible by the host memory controller as a block-oriented mass storage device.

NVDIMM-F: A hybrid memory module consisting of flash memory accessed by the host memory controller as a block-oriented mass storage device.

The hybrid memory module 120 shown in host-based computing environment 1A00 can be considered an NVDIMM-N configuration. As such, a backup power module 150 is shown coupled to the hybrid memory module 120 to deliver power to the hybrid memory module 120 during persistence operations such as data backup and data restore in the event of a system power loss. For example, the backup power module 150 might comprise super capacitors (e.g., supercaps) and/or battery packs attached to the hybrid memory module 120 via a tether cable and store enough charge to keep at least a portion of the hybrid memory module 120 powered up long enough to copy all of its data from DRAM to the flash memory. As shown, data can be transmitted between the DRAM devices and the non-volatile memory controller 128 through a direct data transmission path. In some configurations, the DRAM devices can be port switched devices, each comprising a first port coupled to the data bus (e.g., data bus 114₁, data bus 114₂), and a second port coupled to the direct data transmission path from the non-volatile memory controller 128. In such cases, the first port can be disabled and the second port can be enabled when transmitting data between the DRAM devices and the flash memory devices (e.g., during data backup and data restore operations). In other configurations (e.g., LRDIMMs), the non-volatile memory controller 128 can connect to the DRAM devices through the data buffers.

Further, the hybrid memory module 120 shown in host-based computing environment 1A00 presents merely one partitioning. The specific example shown where the command buffer 126, the non-volatile memory controller 128, and the flash controller 132 are separate components is purely exemplary, and other partitioning is reasonable. For example, any or all of the components comprising the hybrid memory module 120 and/or other components can comprise one device (e.g., system-on-chip or SoC), multiple devices in a single package or printed circuit board, multiple separate devices, and can have other variations, modifications, and/or alternatives.

Unfortunately, legacy NVDIMM architectures can have functional and performance limitations. Specifically, some NVDIMMs can exhibit long latencies and low throughput during certain operations, such as those pertaining to data save and/or data restore operations.

Figure 1B:
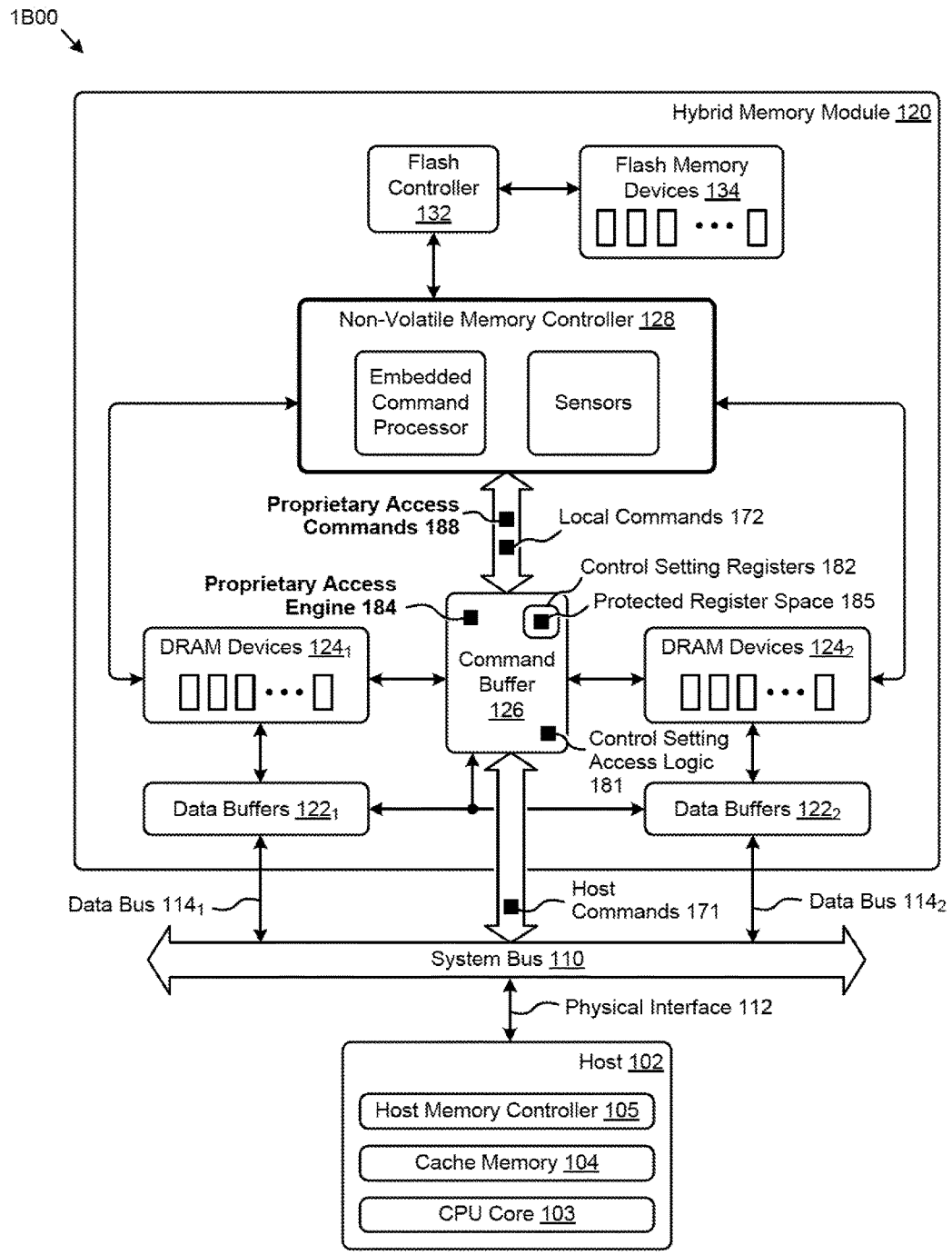
FIG. 1B depicts a hybrid memory module having both volatile memory and non-volatile memory that interfaces with a non-volatile memory controller to implement autonomous volatile memory save and restore operations, according to an embodiment.

FIG. 1B depicts a hybrid memory module 1B00 having both volatile memory and non-volatile memory that interfaces with a non-volatile memory controller to implement autonomous volatile memory save and restore operations. As an option, one or more instances of hybrid memory module 1B00 or any aspect thereof may be implemented in the context of the architecture and functionality of the embodiments described herein. Also, the hybrid memory module 1B00 or any aspect thereof may be implemented in any desired environment.

Also depicted in FIG. 1B is a proprietary access technique for enhancing non-volatile memory controller resource access in hybrid memory modules. As an option, one or more portions of this proprietary access technique or any aspect thereof may be implemented in the context of the architecture and functionality of the embodiments described herein. Also, the proprietary access technique or any aspect thereof may be implemented in any desired environment. In some embodiments, the proprietary access technique can facilitate the herein-disclosed techniques for autonomous non-volatile memory save and restore operations in hybrid memory systems. Further details pertaining to such proprietary access techniques are described as follows.

FIG. 1B shows a proprietary access technique within the host-based computing environment 1A00 comprising the hybrid memory module 120. The proprietary access technique can address the problems attendant to implementing a hybrid memory module that expands the non-volatile memory controller (NVC) resource access, yet does not impact host memory controller resource access when in a host control mode. Specifically, in some embodiments, the command buffer 126 can receive instances of host commands 171 from the host memory controller 105, and receive instances of local commands 172 from the non-volatile memory controller 128. In some cases, such commands are interpreted by a set of control setting access logic 181 to access a set of control setting registers 182 that hold certain instances of control settings (e.g., used to adjust certain characteristics of the command buffer 126). Further, the control setting registers 182 can comprise a protected register space 185 not accessible by the host.

In one or more embodiments, the proprietary access technique comprises a proprietary access engine 184 to interpret one or more proprietary access commands 188 from the non-volatile memory controller 128 (e.g., from an embedded command processor based on various signals from sensors) so as to access the protected register space 185 while still in the host control mode. In one or more embodiments, the proprietary access engine 184 comprises proprietary control setting access logic based in part on the control setting access logic 181 to interpret the proprietary access commands 188 to write to and/or read from the protected register space 185. In one or more embodiments, the proprietary access engine 184 comprises a command router to route the local commands 172 to the control setting access logic 181, and route the proprietary access commands 188 to the proprietary control setting access logic. In one or more embodiments, the proprietary access commands 188 are routed to the proprietary control setting access logic based at least in part on a proprietary mode triggered by a sequence of local commands. Further, in some embodiments, the proprietary access engine 184 comprises an access arbiter to allow access to the protected register space 185 invoked by the host commands 171 and/or the proprietary access commands 188.

Further details related to the proprietary access technique are disclosed in U.S. patent application Ser. No. 14/883,155, entitled "HIGH-THROUGHPUT LOW-LATENCY HYBRID MEMORY MODULE" filed on Oct. 14, 2015, the contents of which is hereby incorporated by reference in its entirety in the present application.

Figure 2A:
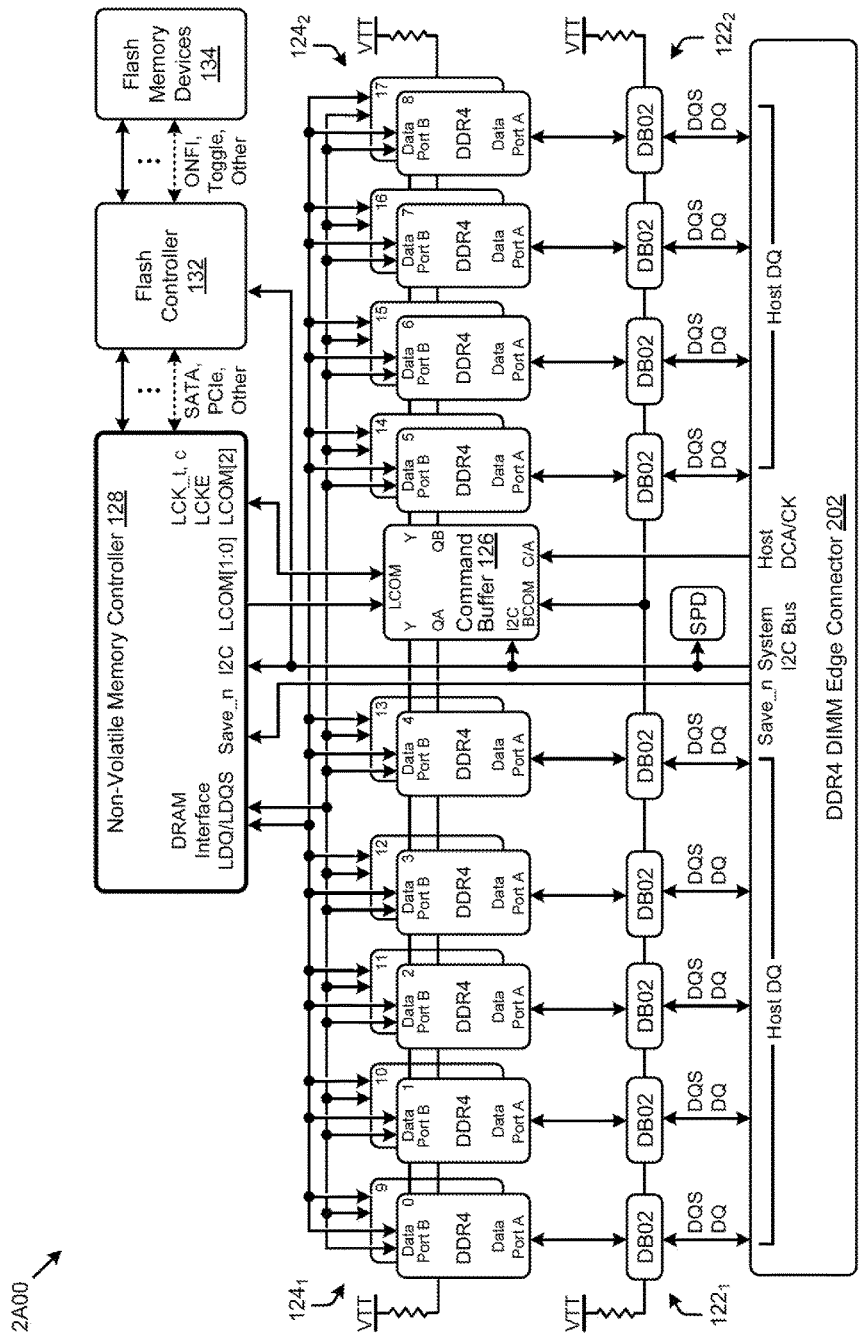
FIG. 2A depicts a DDR-based hybrid memory module having both RAM memory and SSD memory that interfaces with a non-volatile memory controller to implement autonomous volatile memory save and restore operations, according to some embodiments.

FIG. 2A depicts a DDR-based hybrid memory module 2A00 having both RAM memory and SSD memory that interfaces with a non-volatile memory controller to implement autonomous volatile memory save and restore operations. As an option, one or more instances of DDR-based hybrid memory module 2A00 or any aspect thereof may be implemented in the context of the architecture and functionality of the embodiments described herein. Also, the DDR-based hybrid memory module 2A00 or any aspect thereof may be implemented in any desired environment.

The hybrid memory module is one example of an NVDIMM configuration. Specifically, the DRAM devices of the hybrid memory module comprise eighteen DDR4 devices (e.g., ten instances of DRAM devices $124_1$ and eight instances of DRAM devices $124_2$) having data signals (e.g., DQ, DQS, etc.) delivered to a DDR4 DIMM edge connector 202 through a plurality of data buffers (e.g., five instances of data buffers $122_1$ and four instances of data buffers $122_2$). In some cases, two DDR4 devices can share the high bit rate signal connections to a respective data buffer (e.g., DB02 device) in a parallel configuration (e.g., using the DDR4 Data Port A). Further, a first portion of the DDR4 devices (e.g., DDR4-0 to DDR4-4, and DDR4-9 to DDR4-13) can comprise an A-side of the DRAM configuration, and a second portion of the DDR4 devices (e.g., DDR4-5 to DDR4-8 and DDR4-14 to DDR4-17) can comprise a B-side of the DRAM configuration. In some cases, such configurations can be detected by a serial presence detector or SPD at module initialization. The non-volatile memory controller 128 can further have access to the DDR4 device data signals through an LDQ/LDQS path between the DRAM devices (e.g., using the DDR4 Data Port B) and the DRAM Interface of the non-volatile memory controller 128.

As shown, the command buffer 126 can receive commands, addresses, and other information through the DDR4 DIMM edge connector 202 at an input command/address or C/A interface. The command buffer 126 can further communicate (e.g., receive local commands) with the non-volatile memory controller 128 using a local communications interface supporting a physical layer communications protocol such as the LCOM interface protocol defined by JEDEC. The command buffer 126 can communicate (e.g., forward DRAM commands) with the DDR4 devices using an output control/address/command interface (e.g., see the QA output signals for communicating with the A-side, and the QB output signals for communicating with the B-side). In some cases, the command buffer 126 can also communicate (e.g., send control setting commands) with the data buffers using a data buffer control/communication or BCOM interface. Other signals shown in FIG. 2A include those pertaining to the I2C serial bus and the Save_n memory system signal (e.g., for invoking a backup operation at power loss).

Figure 2B:
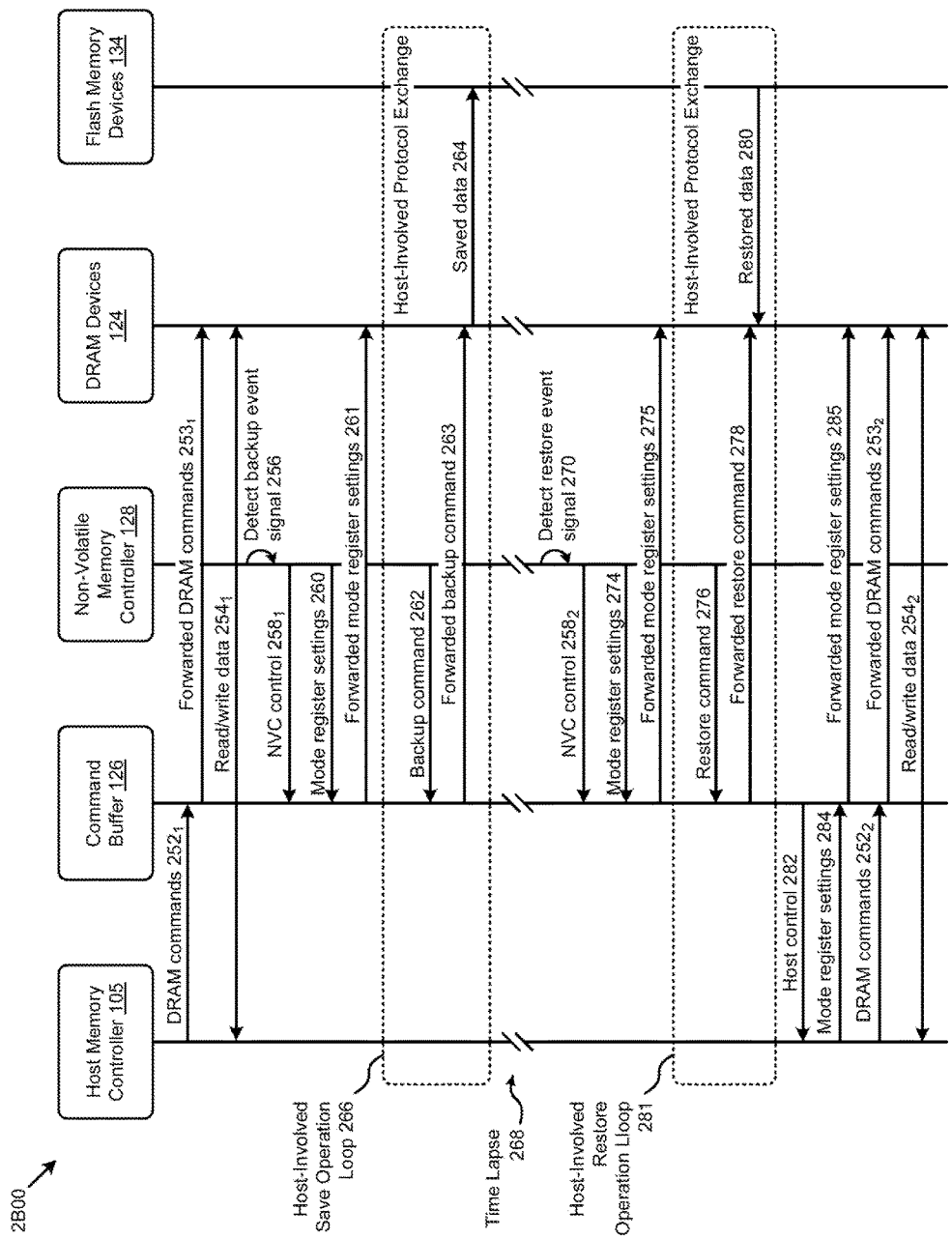
FIG. 2B presents a series of host-involved protocol exchanges between a host memory controller and a non-volatile memory controller, according to some embodiments.

The foregoing signals, interfaces, connections, and other components of the hybrid memory module can be used to execute backup and restore operations as discussed in FIG. 2B.

FIG. 2B presents a series of host-involved protocol exchanges 2B00 between a host memory controller and a non-volatile memory controller. As an option, one or more instances of host-involved protocol exchanges 2B00 or any aspect thereof may be implemented in the context of the architecture and functionality of the embodiments described herein. Also, the host-involved protocol exchanges 2B00 or any aspect thereof may be implemented in any desired environment.

As shown in FIG. 2B, the interactions among hybrid memory module components 2B00 specifically pertain to interactions among the earlier described components comprising the host memory controller 105, the command buffer 126, the non-volatile memory controller 128, the collective set of DRAM devices 124, and the flash memory devices 134. Such components can exhibit a set of high-level interactions (e.g., operations, messages, etc.) as shown. Specifically, the interactions can pertain to backup and restore operations executed on a hybrid memory module. As shown, the host memory controller 105 might have control (e.g., in a host control mode) so as to issue DRAM commands to the command buffer 126 (see message $252_1$) that might be forwarded to the DRAM devices 124 (see message $253_1$). In some cases, the DRAM commands can result in read and/or write data transferred between the host memory controller 105 and the DRAM devices 124 (see message $254_1$).

Such activity might continue until a data backup event signal is received at the non-volatile memory controller 128 (see operation 256). For example, the host and/or the hybrid memory module might have detected the loss of power and triggered the data backup event. Such backup events can be invoked at the non-volatile memory controller 128 from the host memory controller 105 (e.g., via the command buffer 126), from the Save_n signal, and from the I2C bus. In response, control can be provisioned to the non-volatile memory controller 128 by, for example, writing to certain control register settings of the command buffer 126 (see message 258$_1$). The backup operation might then commence with the non-volatile memory controller 128 sending new mode register settings (e.g., specific to the backup operation) to the command buffer 126 (see message 260) that can be forwarded to the DRAM devices 124 (see message 261). The non-volatile memory controller 128 can then begin to issue backup commands to the command buffer 126 (see message 262) that can be forwarded to the DRAM devices 124 (see message 263) to save data from the DRAM devices 124 to the flash memory devices 134 (see message 264). Such backup interactions can continue in a loop (see loop 266) until the backup operation is complete (e.g., all data is saved).

After a time lapse 268, a data restore event signal might be received by the non-volatile memory controller 128 (see operation 270). For example, the line power to the computing system might have returned to trigger the data restore event. In response, control can be provisioned to the non-volatile memory controller 128 by, for example, writing to certain control register settings of the command buffer 126 (see message 258$_2$). The restore operation might commence with the non-volatile memory controller 128 sending new mode register settings (e.g., specific to the restore operation) to the command buffer 126 (see message 274) that can be forwarded to the DRAM devices 124 (see message 275). The non-volatile memory controller 128 can then begin to issue restore commands to the command buffer 126 (see message 276) that can be forwarded to the DRAM devices 124 (see message 278) to restore data from the flash memory devices 134 to the DRAM devices 124 (see message 280). Such restore interactions can continue in a loop (see loop 281) until the restore operation is complete (e.g., all data is restored).

When the restore is complete, the command buffer 126 can provision control to the host memory controller 105 (see message 282). The host memory controller 105 might then initialize the host control session by sending new mode register settings (e.g., specific to host operations) to the command buffer 126 (see message 284) that can be forwarded to the DRAM devices 124 (see message 285). The host memory controller 105 can then resume memory access operations by issuing DRAM commands to the command buffer 126 (see message 252$_2$) to be forwarded to the DRAM devices 124 (see message 253$_2$) to invoke, in some cases, the transfer of read and/or write data between the host memory controller 105 and the DRAM devices 124 (see message 254$_2$).

The hybrid memory module and the interactions among hybrid memory module components 2B00 exemplify various limitations addressed by the herein disclosed techniques. Specifically, FIG. 3A and FIG. 3B describe techniques for improving backup and data restore operations. More specifically, FIG. 3A shows and discusses states and state transitions used by a non-volatile memory controller to perform fully-autonomous backup (e.g., save) and restore operations.

Figure 3A:
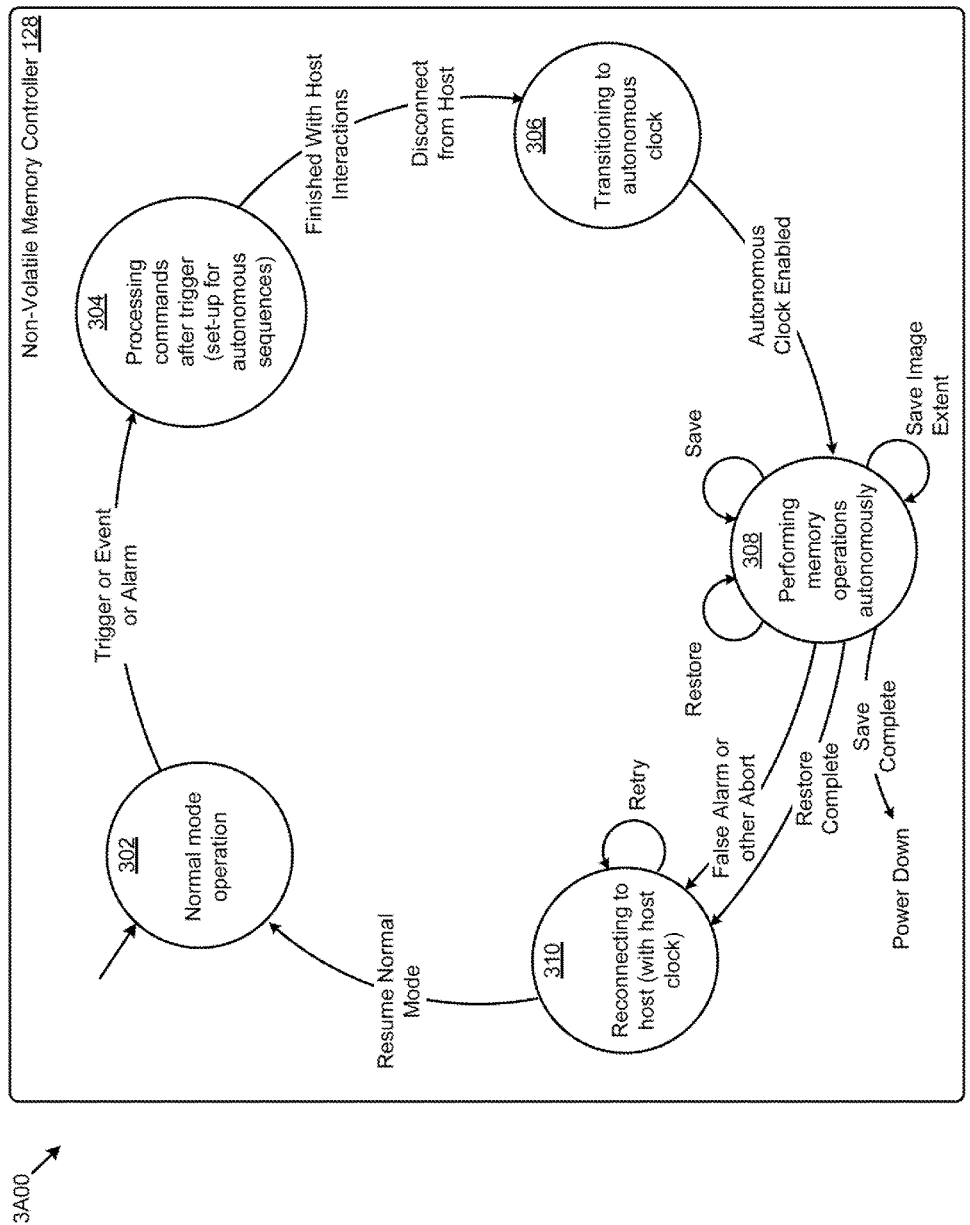
FIG. 3A is a state diagram describing states and transitions that can be implemented by a non-volatile memory controller, according to some embodiments.

FIG. 3A is a state diagram 3A00 describing states and transitions that can be implemented by a non-volatile memory controller. As an option, one or more instances of state diagram 3A00 or any aspect thereof may be implemented in the context of the architecture and functionality of the embodiments described herein. Also, the state diagram 3A00 or any aspect thereof may be implemented in any desired environment.

As shown in FIG. 3A, a "normal" mode of operation is entered (see state 302), and interaction between the non-volatile memory controller 128 and other components in its environment (e.g., a host) can be carried out repeatedly, until such time as a trigger signal or event indication or alarm indication causes a transition to a state that ceases to process in the normal mode, and instead performs processing in advance of disconnecting from the host (see state 304). After a set of condition are met (e.g., completion of host-involved command sequences), the non-volatile memory controller disconnects from the host, and transitions to a state where processing is performed under the regime of a NVC-local clock (see state 306). Having its own clock, and being disconnected from the host, the NVC can operate autonomously without reliance on host communications or host-provided clocking (e.g., see state 308). In such an autonomous state, the NVC can perform operations between volatile memory and non-volatile memory. Such operations can include, but are not limited to, operations to save RAM memory contents to NV memory and/or operations to restore DRAM memory contents stored in NV memory back to RAM. In some embodiments, an address translation table is stored in flash (e.g., to relate logical flash address to physical block addresses). In some embodiments, portions of an address translation table are retrieved from the host. For example, the host might supply a list of memory pages or ranges of pages that were deemed to be actually in-use at the time of the request. Additionally, one or more areas of non-volatile memory can be used to store any forms of NVC persistent data, which can include, without limitation codification of information (e.g., metadata) that might be used for re-initialization of components once power is restored. At some moment in time, the operations of state 308 complete (e.g., a disaster recover image of RAM memory has been saved to SSD), and the system will continue to power-down in the face of the trigger signal (e.g., catastrophic event, etc.).

In some situations, the trigger or alarm or event that caused transition into state 304 either was a false alarm, or the deleterious condition(s) that precipitated the trigger or alarm or event are no longer present (e.g., a power glitch was only a momentary glitch) and the trigger or alarm or event can be deemed to have been a false alarm. In such a case, the NVC attempts to reconnect to components in its environment (see state 310). After any necessary retries (as shown) normal mode clocking is reestablished, and normal mode operation commences. The saved image extent can remain saved to the SSD until such time as an administrative or data management event deletes (or marks for deletion) the extent (e.g., so the SSD can be reused for another save operation or otherwise re-purposed).

Figure 3B:
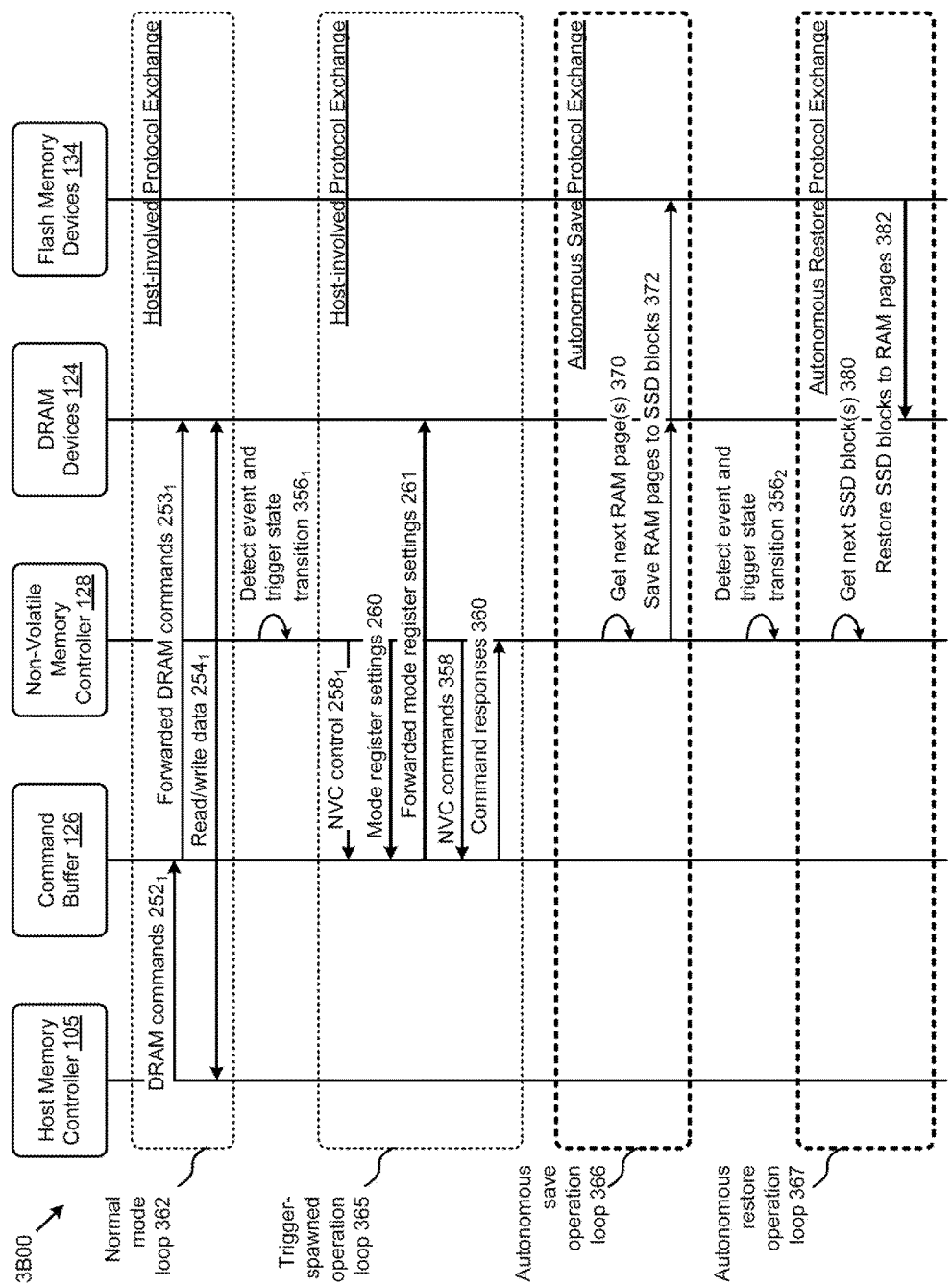
FIG. 3B presents a series of protocol exchanges used when implementing a non-volatile memory controller to perform fully-autonomous save and restore operations, according to some embodiments.

FIG. 3B presents a series of protocol exchanges 3B00 used when implementing a non-volatile memory controller to perform fully-autonomous save and restore operations. As an option, one or more instances of protocol exchanges 3B00 or any aspect thereof may be implemented in the context of the architecture and functionality of the embodiments described herein. Also, the protocol exchanges 3B00 or any aspect thereof may be implemented in any desired environment.

FIG. 3B depicts protocol exchanges pertaining to several loops. As shown, the protocol exchanges include a normal mode loop 362, a trigger-spawned operation loop 365, an autonomous save operation loop 366, and an autonomous restore operation loop 367. In the host-involved protocol exchange pertaining to the normal mode loop 362, the host sends DRAM commands to DRAM devices (see message 252$_1$). The shown NVC might or might not be involved in such host-involved protocol exchanges carried out during processing of the normal mode loop 362. Nevertheless, the NVC is able to detect, either by receipt of a signal (e.g., from the host) or autonomously by one or more sensors (see FIG. 4), the occurrence of an event or trigger or alarm. Measurements and comparisons are carried out by the NVC, which is provisioned so as to detect events and trigger state transitions (see operation $356_1$).

Such a state transition (e.g., to state 304) might enter into a host-involved protocol exchange pertaining to the shown trigger-spawned operation loop 365. An exchange of messages can commence such that the non-volatile memory controller 128 sends mode register settings (e.g., specific to the triggered operation) to the command buffer 126 (see message 260) that can be forwarded to the other components (see message 261). In addition to requests and/or exchanges of register settings, the NVC can carry out any number of operations, for example, so as to prepare for autonomous operation. The NVC can issue commands (see message 358) and can process command responses (see message 360). The destination for such commands and/or the particular respondent can vary depending on the nature of the NVC-issued command. When the trigger-spawned operation loop 365 is deemed to have been completed, an autonomous save operation loop 366 is entered. An autonomous save protocol is carried out, whereby the NVC gets an address of a next RAM page (see operation 370), and the contents at that address are saved to SSD blocks (see message 372).

An NVC component continuously monitors conditions to detect events and trigger state transitions (see operation $356_2$). Upon a trigger or event or alarm, an autonomous restore operation loop 367 is entered. An autonomous restore protocol is carrier out whereby the NVC gets an address of an SSD block to be restored (see operation 380) and the contents are restored to a corresponding RAM page (see operation 382). Such a restore operation can use the aforementioned address translation table to perform a complete restoration of a DRAM image. In some cases, the extent_(e.g., virtual size of that image) as well as the flash storage locations used programmable. A programmable structure (e.g., a directory) that can be populated with metadata referring to saved DRAM image pages or ranges of pages (e.g., addresses and lengths) as well as to the corresponding blocks that are stored within the SSD (e.g., at block offset 0).

Further details related to forms of DRAM page metadata are disclosed in U.S. patent application Ser. No. 14/963,098, entitled "PERSISTENT MEMORY DESCRIPTOR" (Atty. No. A929RO-012200US), filed on Dec. 8, 2015, the contents of which is hereby incorporated by reference in its entirety in the present application.

Figure 4:
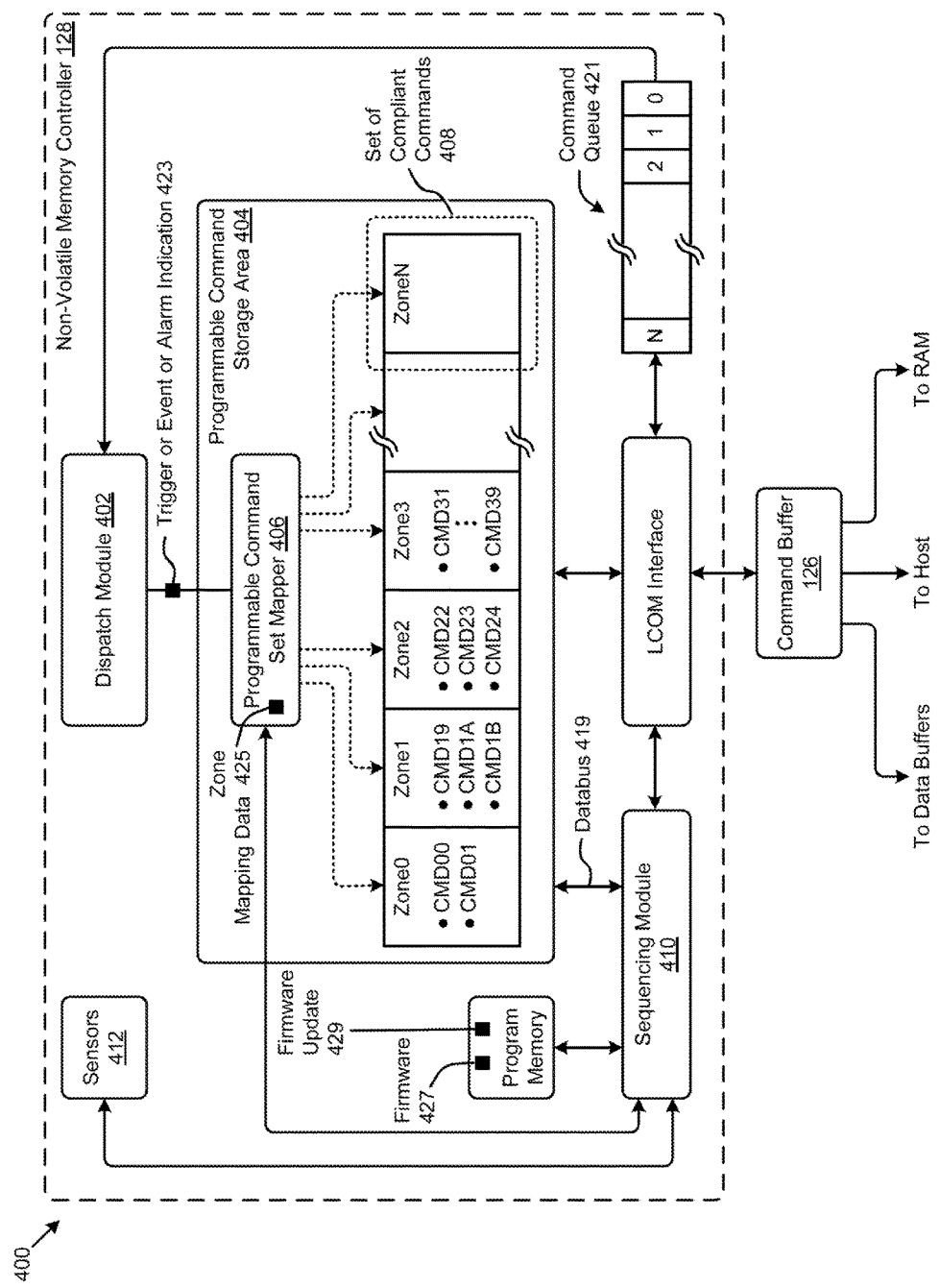
FIG. 4 is a block diagram of a programmable non-volatile memory controller that is provisioned to perform fully-autonomous operations, according to some embodiments.

A non-volatile memory controller 128 in an implementation that can carry out the state transitions and protocol exchanges (e.g., host-involved protocol exchanges and/or autonomous protocol exchanges) of FIG. 3A and FIG. 3B is shown and described as pertains to FIG. 4.

FIG. 4 is a block diagram of a programmable non-volatile memory controller 400 that is provisioned to perform fully-autonomous operations. As an option, one or more instances of programmable non-volatile memory controller 400 or any aspect thereof may be implemented in the context of the architecture and functionality of the embodiments described herein. Also, the programmable non-volatile memory controller 400 or any aspect thereof may be implemented in any desired environment.

The shown non-volatile memory controller 128 is made programmable by the provisioning of a sequencing module 410 (e.g., a micro-controller) that can read/write any portions of firmware 427 to/from program memory. The sequencing module 410 can fetch command sequences, and/or programmable instructions or micro-code and can access a programmable storage area (e.g., over a data bus 419). The sequencing module 410 can also read/write to/from a bank of sensors (e.g., sensors 412) so as to calibrate and enable one or more sensors that detect and classify events (e.g., voltage events, temperature events, etc.). As indicated in the discussion of FIG. 3B, various measurements and comparisons can be carried out by the NVC. The bank of sensors is provisioned in the programmable non-volatile memory controller 400 so as to detect events and trigger state transitions. Upon such a transition, an exchange of messages can commence such that the non-volatile memory controller 128 sends out commands (e.g., to the command buffer 126), which commands can be routed (e.g., by the command buffer 126) to a host and/or to RAM and/or to data buffers, as shown. Communication between the NVC and the command buffer can be facilitated by an LCOM interface. In some embodiments, additional interfaces are provided, some of which can be used to establish an initial load of firmware 427, and/or to provide a firmware update 429. A firmware update 429 might comprise an entire software image that completely overwrites any pre-loaded firmware, or a firmware update 429 might take the form of patches to be applied over a pre-loaded software image. In some cases, a firmware update includes updated tables and/or metadata that can be read (e.g., under software control). Certain NVC components and/or certain host components can read/write the contents of the programmable command storage area to validate, modify, replace as necessary. Such updates can be performed at any moment in time, except during processing after an alert of a catastrophic event. The beginning and ending conditions pertaining to during processing after an alert of a catastrophic event are programmable.

Any of the aforementioned commands can be formatted and stored in a programmable command storage area 404. In some cases, and as shown, groups of commands are organized into zones (e.g., zone0, zone1, zone2, zone3, and zoneN). Each zone can comprise any number of commands. In some embodiments, each of the commands in a zone are stored so as to be executed successively (e.g., CMD00 followed by CMD01, etc.). Any zone can comprise commands that are organized into a set of compliant commands 408. In some situations, the commands include timing characteristics such that the sequencing module will observe timing conditions or constraints as may be necessary for standard-compliant communication to memory components such as DRAM components or SSD components.

The shown LCOM interface can receive incoming commands or other data (e.g., responses to outbound commands) and can route the incoming items. In some cases, the incoming items (e.g., commands) are entered into a push end of a command queue 421, which is accessed from the pull end of the command queue by a dispatch module 402. A dispatch module can process data (e.g., by routing the data) and/or commands (e.g., by routing the commands) and/or events (e.g., by routing the events). More specifically, and as shown, a trigger or event or alarm indication 423 can be used to index into a programmable command set mapper 406 so as to access zone mapping data 425, and thereby to determine one or more sets of compliant commands that can be executed in response. In the example shown, a trigger or event or alarm indication 423 might include an integer value (e.g., event01, event 02, event0N, etc.) and that integer value can be used to index into the first, or second, or Nth entry in a map. The map might in turn return a value that can be interpreted as the beginning of a zone. Strictly as an example, a trigger or event or alarm indication 423 having a corresponding integer value "00" might be used in conjunction with the map to determine that the set of compliant commands are located in Zone1, for example, beginning at the address provided by the programmable command set mapper. In some cases, command sequences or portions thereof are executed asynchronously (e.g., interleaved) with respect to any incoming or outgoing host commands. Furthermore, command sequences can be executed asynchronously with respect incoming or outgoing responses from the command buffer.

A programmable non-volatile memory controller 400 such as heretofore discussed can be programmed so as to be compliant with virtually any DRAM interface and/or virtually any SSD components. Strictly as one example, the programmable non-volatile memory controller 400 and/or the LCOM interface logic can be programmed so as to be compliant with interfacing requirements of a double data rate DRAM. More particularly, the programmable non-volatile memory controller 400 and/or the LCOM interface logic can be programmed so as to carry out operations with one or more ranks of DRAMs, and/or other components in a memory system, in a connected mode. Similarly, the programmable non-volatile memory controller 400 and/or the LCOM interface logic can be programmed so as to carry out operations in an autonomous or disconnected mode. Techniques to transition between a connected mode and a disconnected mode, and techniques to reconnect to a host are shown and described as pertains to FIG. 5.

Figure 5:
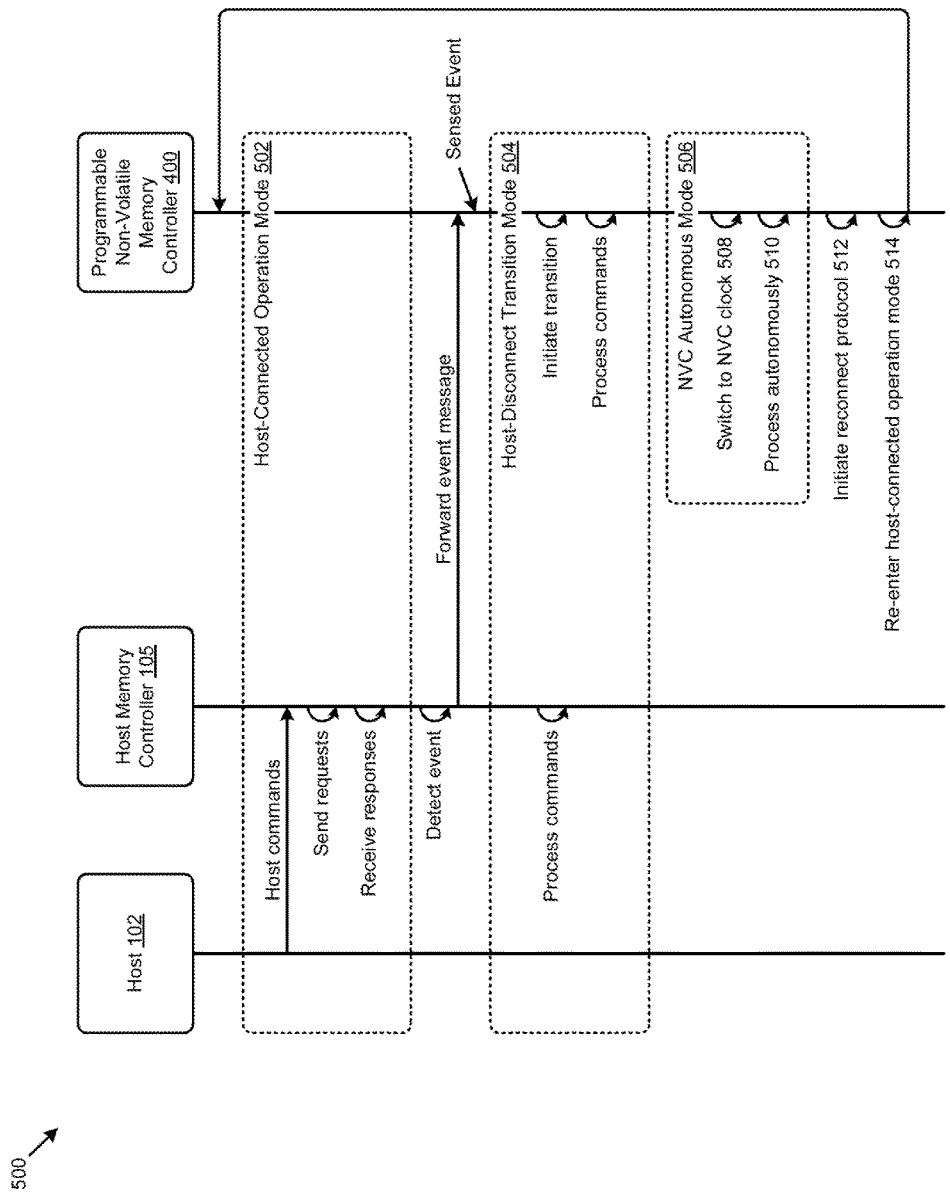
FIG. 5 depicts a series of protocol sequences including disconnect-reconnect protocol sequences between a host and an autonomous non-volatile memory controller, according to some embodiments.

FIG. 5 depicts a series of protocol sequences including disconnect-reconnect protocol sequences 500 pertaining to a host and an autonomous non-volatile memory controller. As an option, one or more instances of disconnect-reconnect protocol sequences 500 or any aspect thereof may be implemented in the context of the architecture and functionality of the embodiments described herein. Also, the disconnect-reconnect protocol sequences 500 or any aspect thereof may be implemented in any desired environment.

In FIG. 5, the shown host 102 sends host commands to a host memory controller 105, which in turn executes various exchanges (e.g., sends requests and receives responses) with certain components comprising the memory system. Such exchanges can be carried out in a host-connected operation mode 502. At some moment in time, an event might be detected and/or forwarded (e.g., by a host memory controller through a command buffer, and/or by an external sensor, and/or by an I2C capable device, etc.), and a trigger or event or alarm indication is sent to the programmable non-volatile memory controller. In some situations the same event might be detected by the programmable non-volatile memory controller. Either the host-detected event or the autonomously-detected event can be processed by the programmable non-volatile memory controller so as to enter a host-disconnect transition mode 504, which in turn moves to or through states that process commands (e.g., to disable a host command interface) before disconnecting from the host. Once readiness to disconnect is deemed achieved, then the programmable non-volatile memory controller transitions to an NVC autonomous mode 506, which mode is disconnected from the host and, as such, no longer relies on the host for commands, data or clocks. As shown, during processing in the NVC autonomous mode 506 the programmable non-volatile memory controller 400 will switch to use of an NVC clock (see operation 508). Such an NVC clock can be implemented as a separate oscillator that is independent from the host. After processing autonomously (see operation 510), for example, to perform a save operation, the programmable non-volatile memory controller 400 can initiate a reconnect protocol 512. Upon successful reconnection, the programmable non-volatile memory controller 400 again enters the host-connected operation mode (see operation 514).

Certain aspects in some embodiments of the present application are related to material disclosed in one or more "JEDEC STANDARD" publications. In particular, some embodiments of the present application are related to JEDEC Publication titled "JESD79-4A Revision of JESD79-4" dated September 2012, the content of which is incorporated by reference in its entirety in this Application.

The operations to switch to the NVC clock (see operation 508) and to process save and restore operations autonomously are shown and discussed in the following figures. Specifically, FIG. 6A, FIG. 6B, FIG. 6C, FIG. 6D, and FIG. 6E depict portions of save protocol sequences as used when implementing fully-autonomous save operations. Also FIG. 7A, FIG. 7B, FIG. 7C, FIG. 7D, and FIG. 7E depict trailing portions of restore protocol sequences as used when implementing fully-autonomous restore operations.

FIG. 6A, FIG. 6B, FIG. 6C, FIG. 6D, and FIG. 6E depict trailing portions of save protocol sequences as used when implementing fully-autonomous save operations. As an option, one or more instances of save protocol sequences or any aspect thereof may be implemented in the context of the architecture and functionality of the embodiments described herein. Also, the save protocol sequences or any aspect thereof may be implemented in any desired environment.

The series of figures from FIG. 6A through FIG. 6E depict a memory system 600 that is interconnected to an external host 602. The shown memory system comprises DRAM components 610, data buffer components 608, an NVC component 606, and an RCD component 604.

Figure 6A:
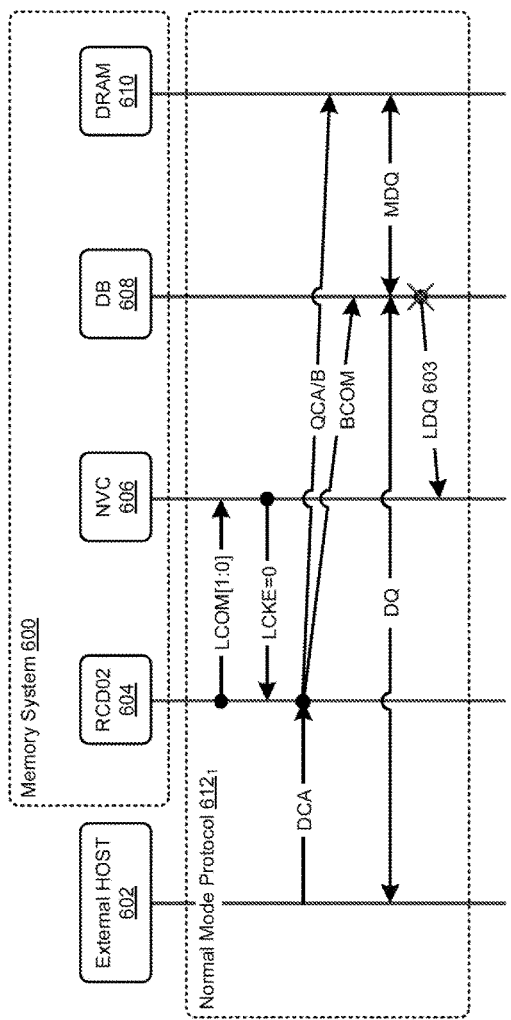
FIG. 6A, FIG. 6B, FIG. 6C, FIG. 6D, and FIG. 6E depict trailing portions of save protocol sequences as used when implementing fully-autonomous save operations, according to some embodiments.
Figure 6B:
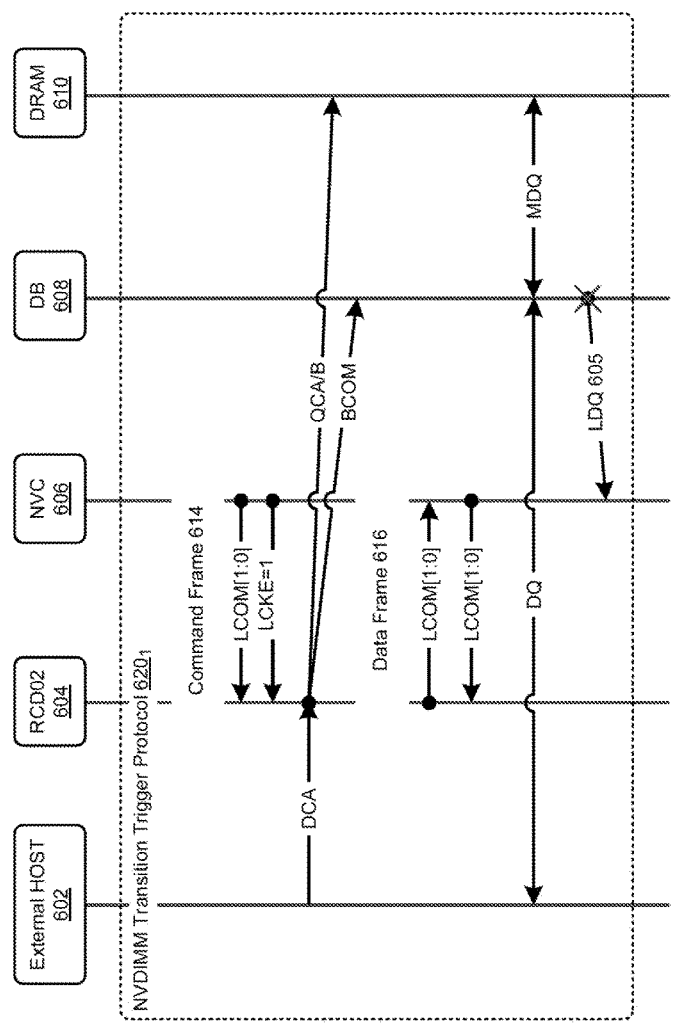
Figure 6C:
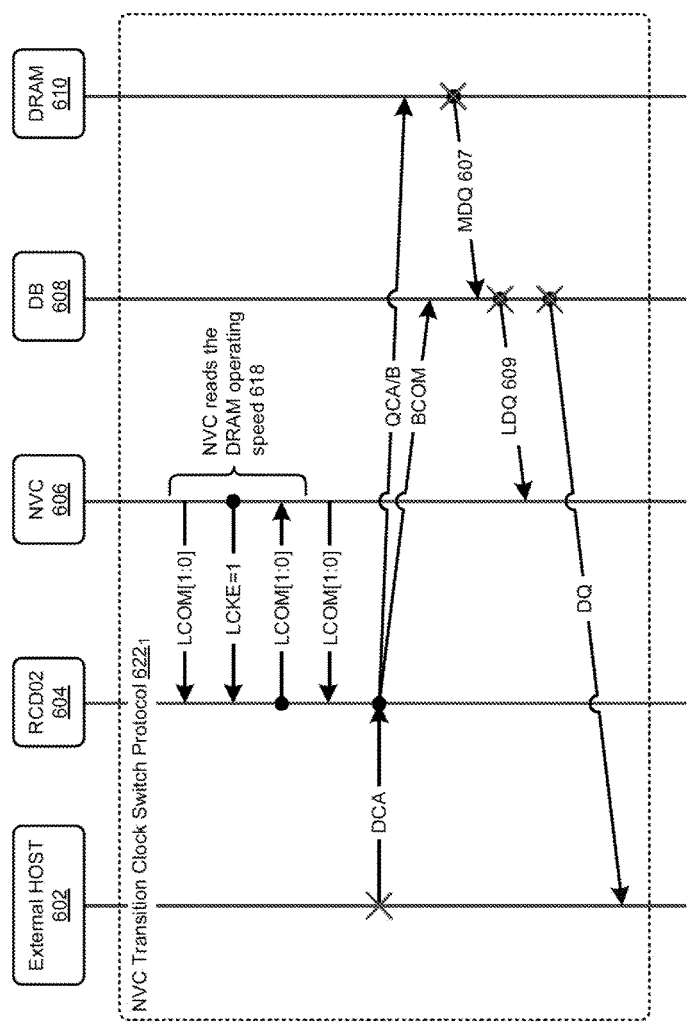
Figure 6D:
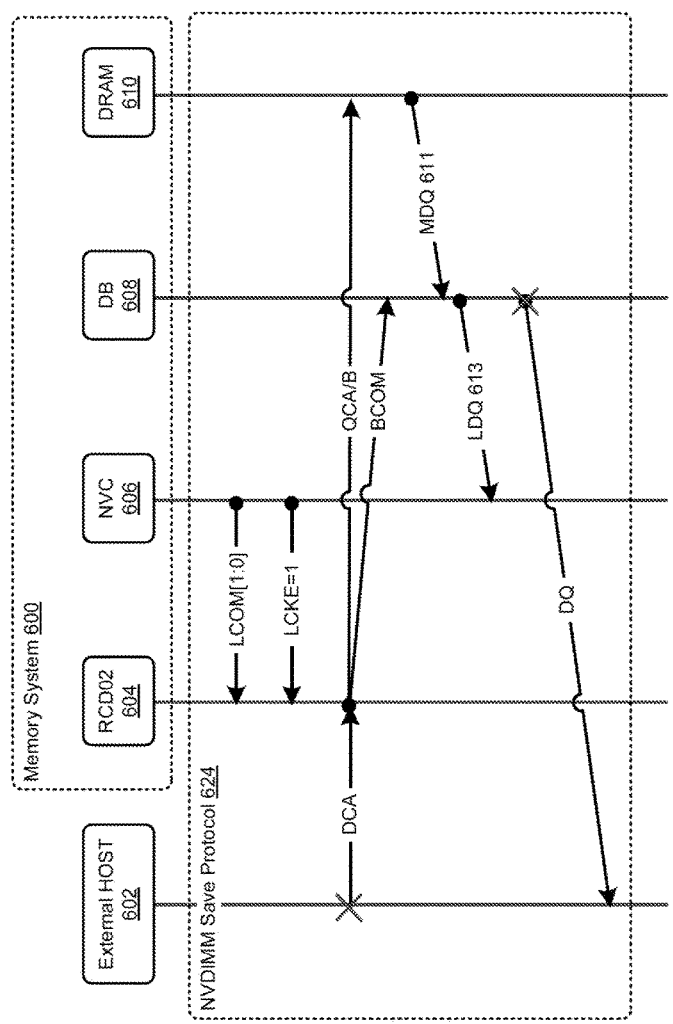
Figure 6E:
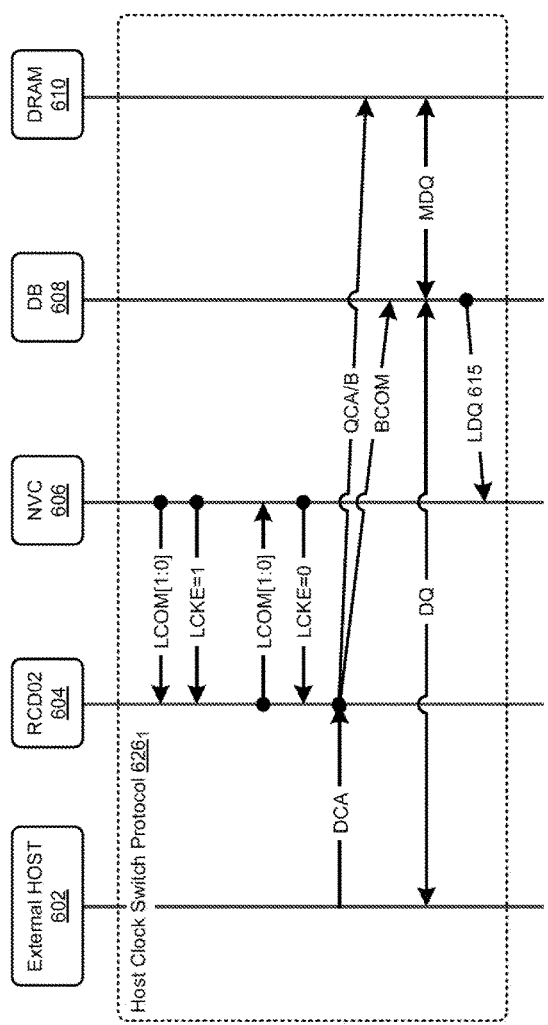

The series of figures depict several protocol sequences, some of which are named as a normal mode protocol $612_1$ (see FIG. 6A), an NVDIMM transition trigger protocol $620_1$ (see FIG. 6B), an NVC transition clock switch protocol $622_1$ (see FIG. 6C), an NVDIMM save protocol 624 (see FIG. 6D), and a host clock switch protocol $626_1$ (see FIG. 6E).

Referring to FIG. 6A, the NVC component communicates with the RCD using known-in-the-art signaling (e.g., involving LCOM, LCKE, DCA, QCA/B, BCOM, DQ, MDQ, and LDQ signaling). As shown, the trailing portion of the shown protocol sequences includes a communication of a command from the data buffer components 608 to the NVC component 606 (see LDQ 603). The LDQ 603 signaling includes an event indication, which in turn causes entry into the NDVIMM transition trigger protocol $620_1$ (see FIG. 6B). The NDVIMM transition trigger protocol includes a command frame 614 as well as a data frame 616. There may be many such communications between a downstream frame and an upstream frame so as to prepare for switching into an autonomous mode. The trailing portion of the shown protocol of FIG. 6B concludes with a communication of a command from a DB component to the NVC component (see LDQ 605). Upon conclusion of NDVIMM transition trigger protocol $620_1$ the memory system will take steps to become fully autonomous from the host. Specifically, and as shown in FIG. 6C, an NVC transition clock switch protocol $622_1$ is entered. Within this protocol, the NVC component reads parameters such as the DRAM operating speed 618. At some point during the exchanges within NVC transition clock switch protocol $622_1$, the NVC is fully autonomous and is in a state of readiness to perform a save operation.

Some of the communications to and from the external host 602 may not reach their intended recipients, or may not occur at all, such as due to a host-initiated power-down sequence or possibly due to a catastrophic event. Such communications are shown with an "X" at the sending end of the communication (e.g., see MDQ 607, and see LDQ 609).

Regardless of the state of the external host 602, the memory system 600 can carry out communications between DRAM components 610, the data buffer components 608, and the NVC component (e.g., see message MDQ 611 and message LDQ 613). Using a series of exchanges such as between the DRAM components and the NVC component (eventually to an SSD, not shown), the contents of the DRAM can be saved into non-volatile storage. At some point in time (after a successful sequence of save operations) and/or under certain conditions (e.g., detection of a false alarm) it is possible that the NVC component can reconnect to the external host. A portion of a possible protocol is shown in FIG. 6E. Specifically, a host clock switch protocol 626$_1$ serves to reconnect the NVC component to an external host after a memory system save. As shown, the last message in the host clock switch protocol confirms (e.g., using a connected status acknowledgement indication) the establishment of connection (see LDQ 615).

The foregoing series of figures depict several protocol sequences to implement a memory system save. Some of the communications between the components are also used in protocol sequences to implement a memory system save. Some of such protocol sequences to implement a memory system restore are shown and described in the following figures.

FIG. 7A, FIG. 7B, FIG. 7C, FIG. 7D, and FIG. 7E depict trailing portions of restore protocol sequences as used when implementing fully-autonomous restore operations. As an option, one or more instances of restore protocol sequences or any aspect thereof may be implemented in the context of the architecture and functionality of the embodiments described herein. Also, the restore protocol sequences or any aspect thereof may be implemented in any desired environment.

Figure 7A:
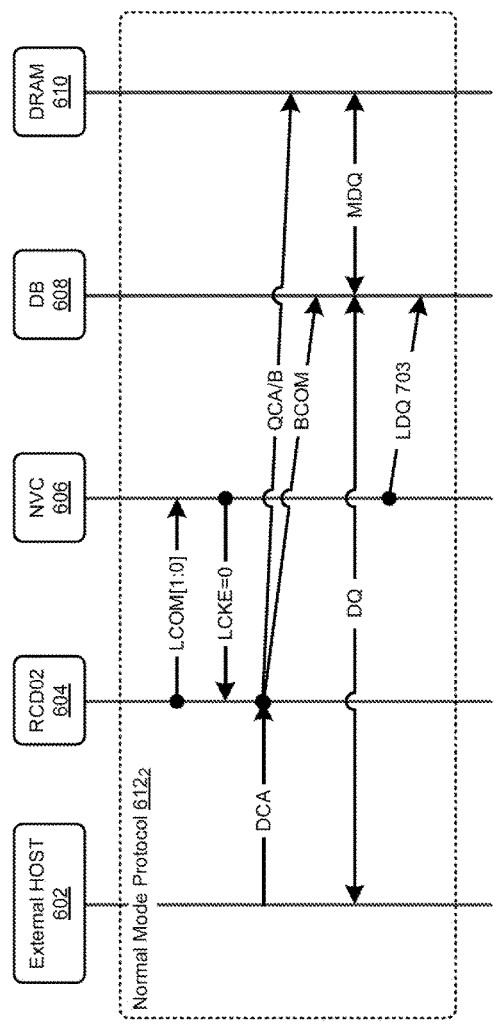
FIG. 7A, FIG. 7B, FIG. 7C, FIG. 7D, and FIG. 7E depict trailing portions of restore protocol sequences as used when implementing fully-autonomous restore operations, according to some embodiments.
Figure 7B:
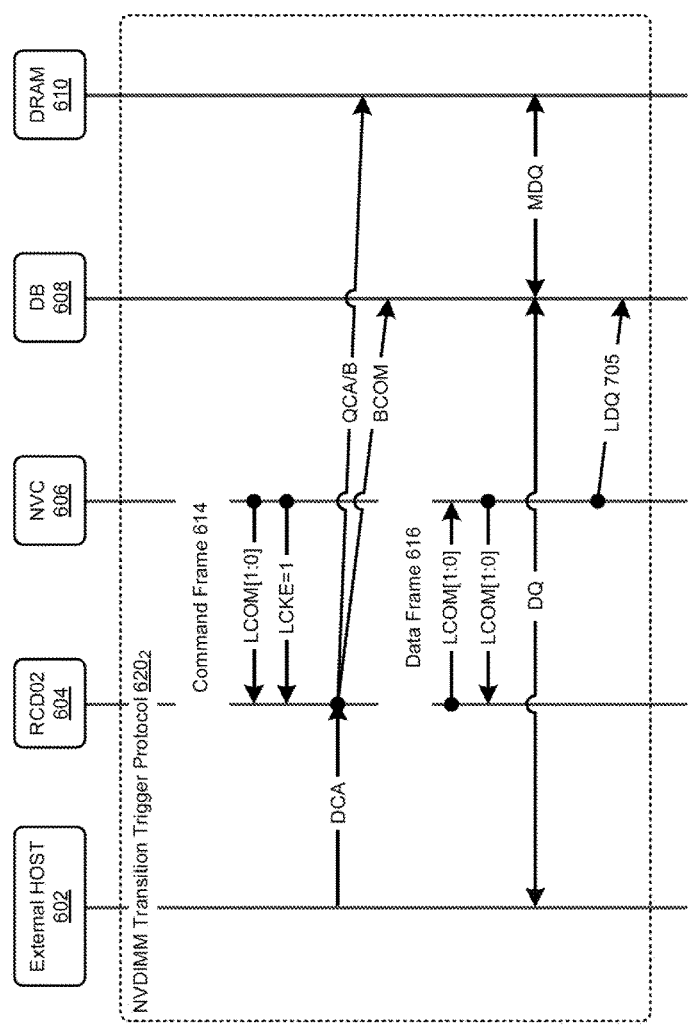
Figure 7C:
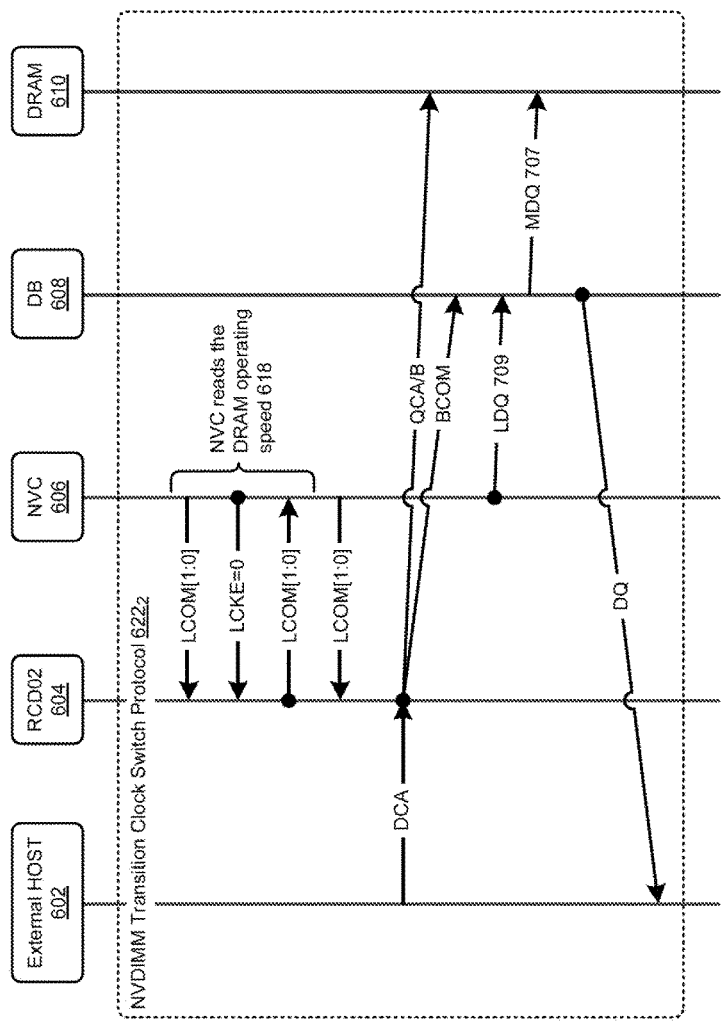
Figure 7D:
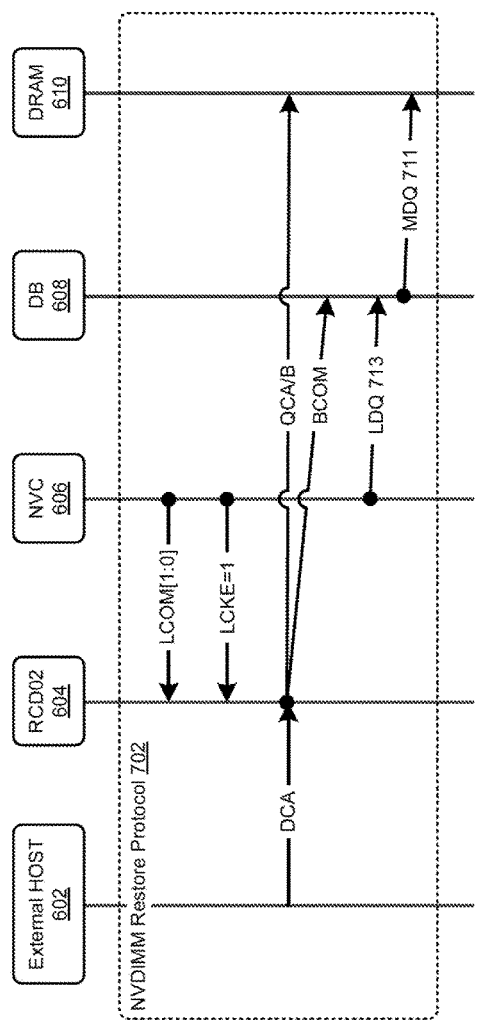
Figure 7E:
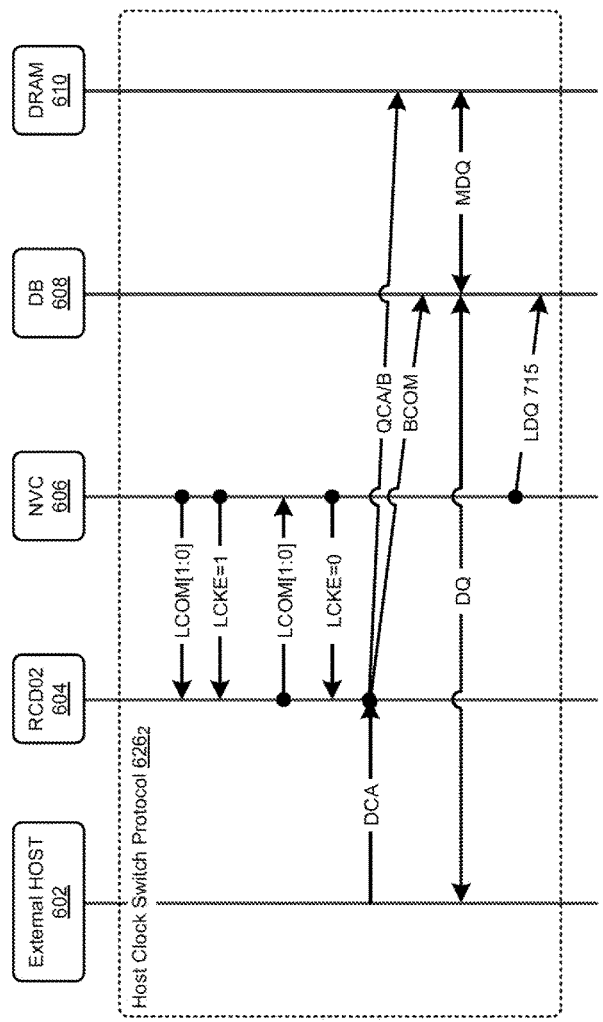

The series of figures depict several protocol sequences, some of which are named as a normal mode protocol 612$_2$ (see FIG. 7A), an NVDIMM transition trigger protocol 620$_2$ (see FIG. 7B), an NVC transition clock switch protocol 622$_2$ (see FIG. 7C), an NVDIMM restore protocol 702 (see FIG. 7D), and a host clock switch protocol 626$_2$ (see FIG. 7E).

Some of the messaging between components as depicted in the series FIG. 7A through FIG. 7E are the same as the messaging between components as depicted in the series FIG. 6A through FIG. 6E, however there are some differences, a sampling of which differences is discussed hereunder. For example, and as shown in FIG. 7A, the message LDQ 703 originates at the NVC component 606 and is destined for a data buffer component. As another example, and as shown in FIG. 7B, the message LDQ 705 originates at the NVC component 606 and is destined for a data buffer component. As yet another example, and as shown in FIG. 7C, the message LDQ 709 originates at the NVC component 606 and is destined for a data buffer component, and the message MDQ 707 originates at a data buffer component and is destined for a DRAM component.

Completion of step involved in the normal mode protocol 612$_2$, and completion of steps involved in the NVDIMM transition trigger protocol 620$_2$, and completion of steps involved in the NVC transition clock switch protocol 622$_2$, places the NVC component in a condition ready for executing an NVDIMM restore protocol 702. As shown in FIG. 7D, the message LDQ 713 and MDQ 711 serve the function of moving non-volatile data blocks stored on SSD to volatile memory pages.

A restore operation can be performed autonomously either while connected to the external host, or autonomously while disconnected from the external host. In the latter case, when the restore is deemed complete, the NVC component can reconnect to the external host. The messaging LDQ 715 serves to close the host clock switch protocol 626$_2$.

Figure 8:
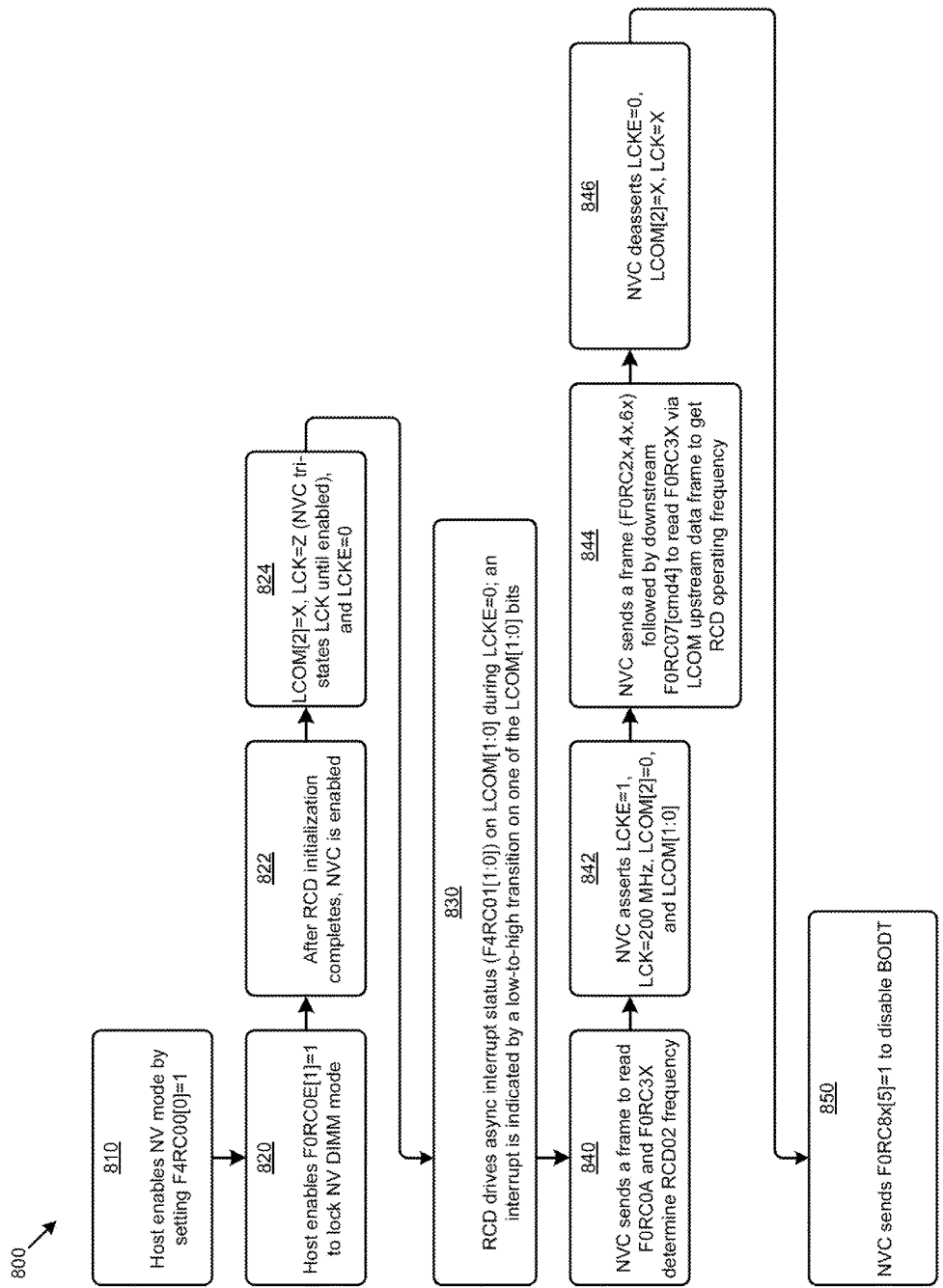
FIG. 8 presents portions of a normal mode flow as used when implementing a fully-autonomous non-volatile memory controller, according to some embodiments.

FIG. 8 presents portions of a normal mode flow 800 as used when implementing a fully-autonomous non-volatile memory controller. As an option, one or more instances of normal mode flow 800 or any aspect thereof may be implemented in the context of the architecture and functionality of the embodiments described herein. Also, the normal mode flow 800 or any aspect thereof may be implemented in any desired environment.

FIG. 8 depicts a flow in accordance with a JEDEC standard. As shown, a host enables NV mode by setting F4RC00[0]=1 (see step 810). The host also enables F0RC0E[1]=1 to lock into NV DIMM mode (see step 820). After RCD initialization completes, the NVC is enabled (see step 822). Next, set LCOM[2]=X, and LCK=Z (NVC tri-states LCK until enabled), and set LCKE=0 (see step 824). Then, after NVC enabled, LCK and LCKE are driven in accordance with the heretofore-described protocols. The RCD drives async interrupt status (F4RC01[1:0]) on LCOM[1:0] during LCKE=0. An interrupt is indicated by a low-to-high transition on one of the LCOM[1:0] bits (see step 830). The NVC sends a command frame to read F0RC0A and F0RC3X determine RCD02 frequency (see step 840), and the NVC asserts LCKE=1, LCK=200 MHz, LCOM[2]=0, and LCOM[1:0] (see step 842).

To aid in the transition to autonomous operations, the NVC sends a command frame (F0RC2x,4x,6x) followed by downstream F0RC07[cmd4] to read F0RC3X via LCOM data frame to get RCD operating frequency. The NVC can calculate F0RC0A based on F0RC3X (see step 844). NVC deasserts LCKE=0, resulting in LCOM[2]=X, and LCK=XAs an alternative, an NVC can be programmed (e.g., via I2C) to store a particular NV operating speed (see step 846).

If needed (e.g., depending on the BIOS initialization sequences), the NVC sends F0RC8x[5]=1 to disable BODT. In some cases, such as in the presence of an RDIMM, a BIOS might have disabled the BCOM interface (see step 850).

Figure 9:
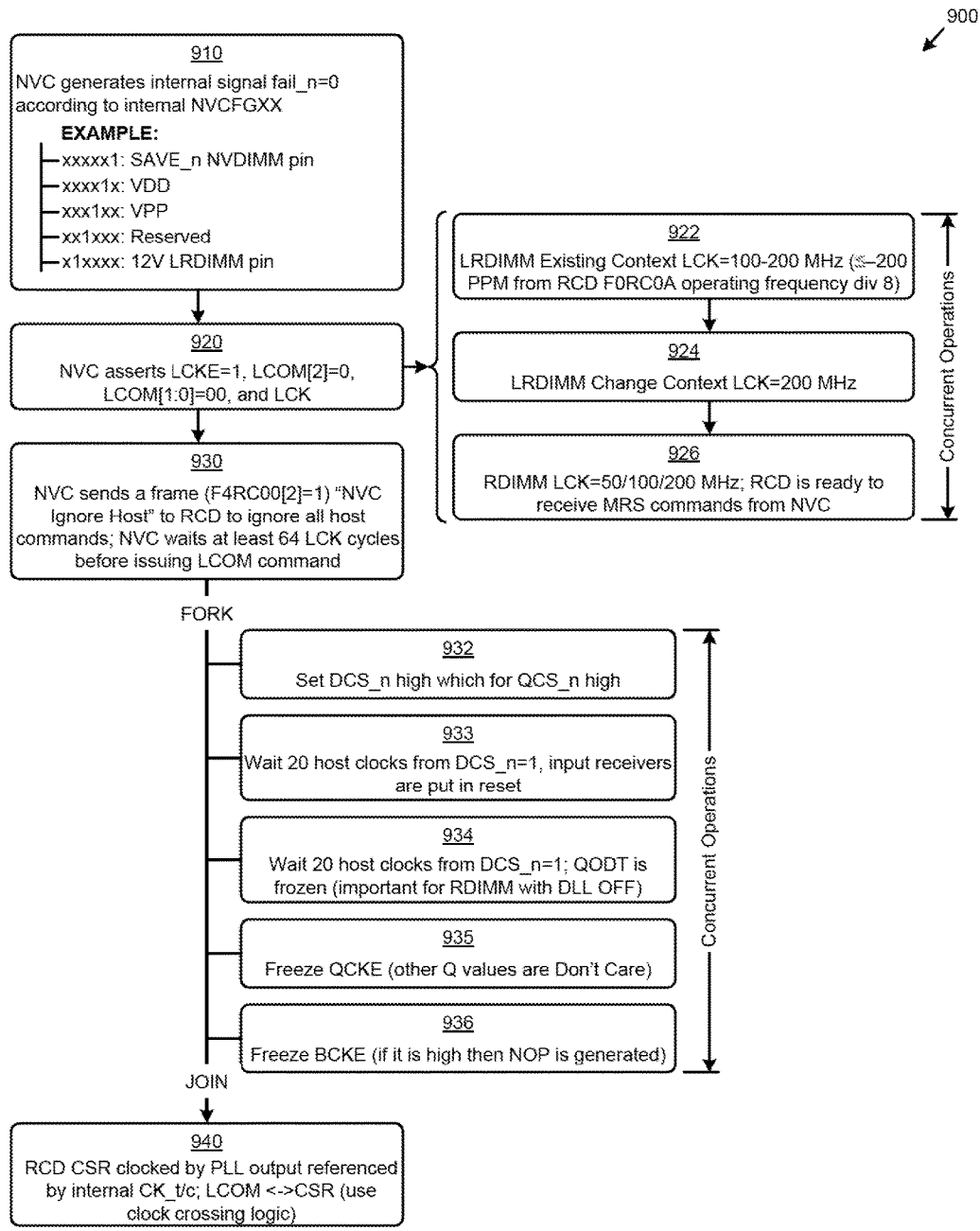
FIG. 9 presents portions of an event-triggered flow as used when implementing a fully-autonomous non-volatile memory controller, according to some embodiments.

FIG. 9 presents portions of an event-triggered flow 900 as used when implementing a fully-autonomous non-volatile memory controller. As an option, one or more instances of event triggered-flow 900 or any aspect thereof may be implemented in the context of the architecture and functionality of the embodiments described herein. Also, the event triggered-flow 900 or any aspect thereof may be implemented in any desired environment.

An NVC generates an internal signal "fail_n=0" according to an internal configuration NVCFGXX (see step 910). Strictly as one example, NVCFGXX values can be masked (e.g., using a bitwise mask) for interpretation as follows (where x's are Don't Care indications):

xxxxx1: SAVE_n NVDIMM pin,
xxxx1x: VDD,
xxx1xx: VPP,
xx1xxx: Reserved, and
x1xxxx: 12V LRDIMM pin.

In operation, an NVC asserts LCKE=1, LCOM[2]=0, LCOM[1:0]=00, and LCK (see step 920). Some steps can be executed serially or concurrently so as to capture existing context. As an example, the following operations execute serially:

Capture existing context. Example: LCK=100-200 MHz (see step 922), then

Perform change of context. Example: LCK=200 MHz (see step 924).

At this point, the RDIMM LCK is set and RCD is ready to receive MRS commands from the NVC (see step 926).

The NVC sends a command frame (F4RC00[2]=1—"NVC Ignore Host") to RCD so it will ignore all host commands. In this embodiment, the NVC must wait at least 64 LCK cycles before issuing any LCOM command. In some cases, some of the following steps are executed serially. In other cases, some of the following steps are executed concurrently. For example, when D/A is disconnected some of the following steps are executed concurrently (see step 930). For example:

Set DCS_n high which for QCS_n high (see step 932).

Wait 20 host clocks from DCS_n=1, input receivers are put in reset (see step 933).

Wait 20 host clocks from DCS_n=1; QODT is frozen (important for RDIMM with DLL OFF) (see step 934).

Freeze QCKE (see step 935).

Freeze BCKE (if it is high then NOP is generated) (see step 936).

Now, RCD CSR is clocked by PLL output referenced by internal CK_t/c. Clock crossing logic is consulted (see step 940).

Figure 10A:
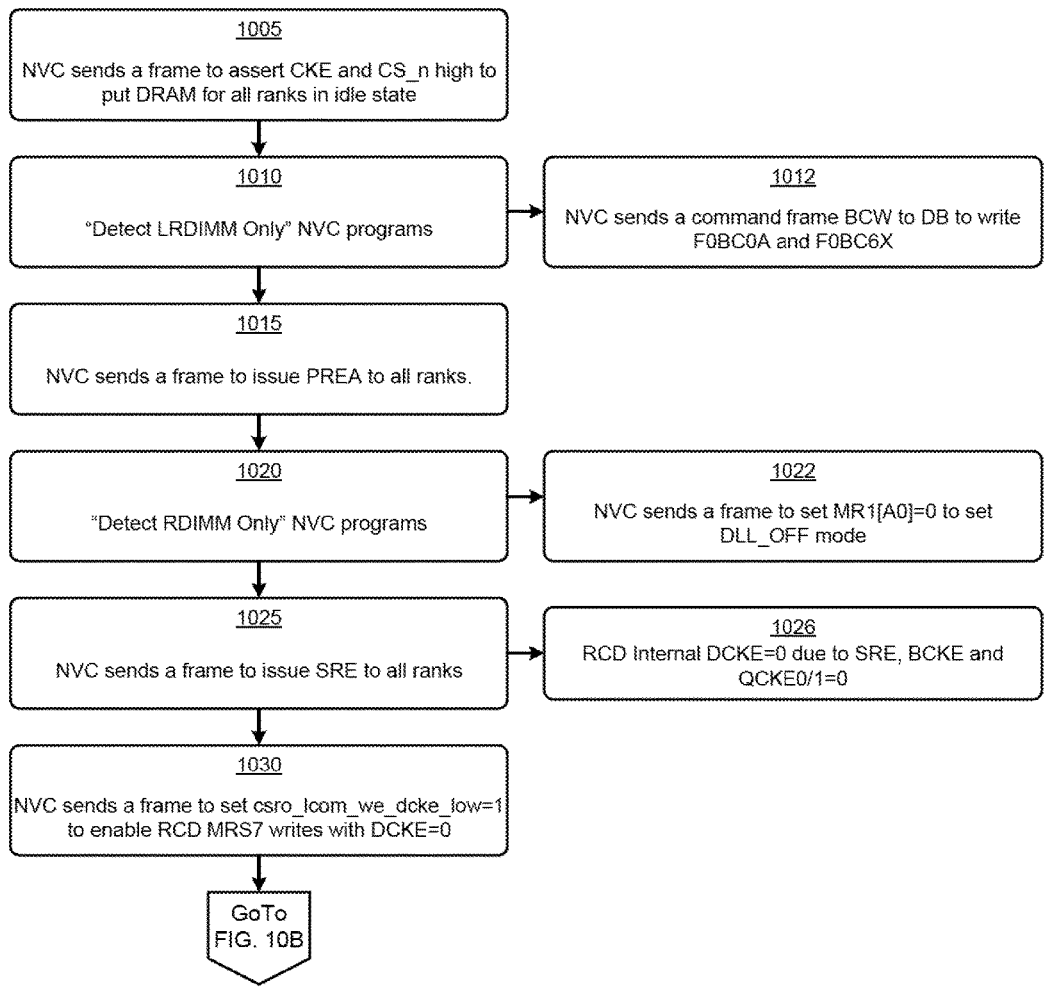
FIG. 10A, FIG. 10B, and FIG. 10C present clock transition and disconnection steps taken to enter a fully-autonomous flow as used to implement a fully-autonomous non-volatile memory controller, according to some embodiments.
Figure 10B:
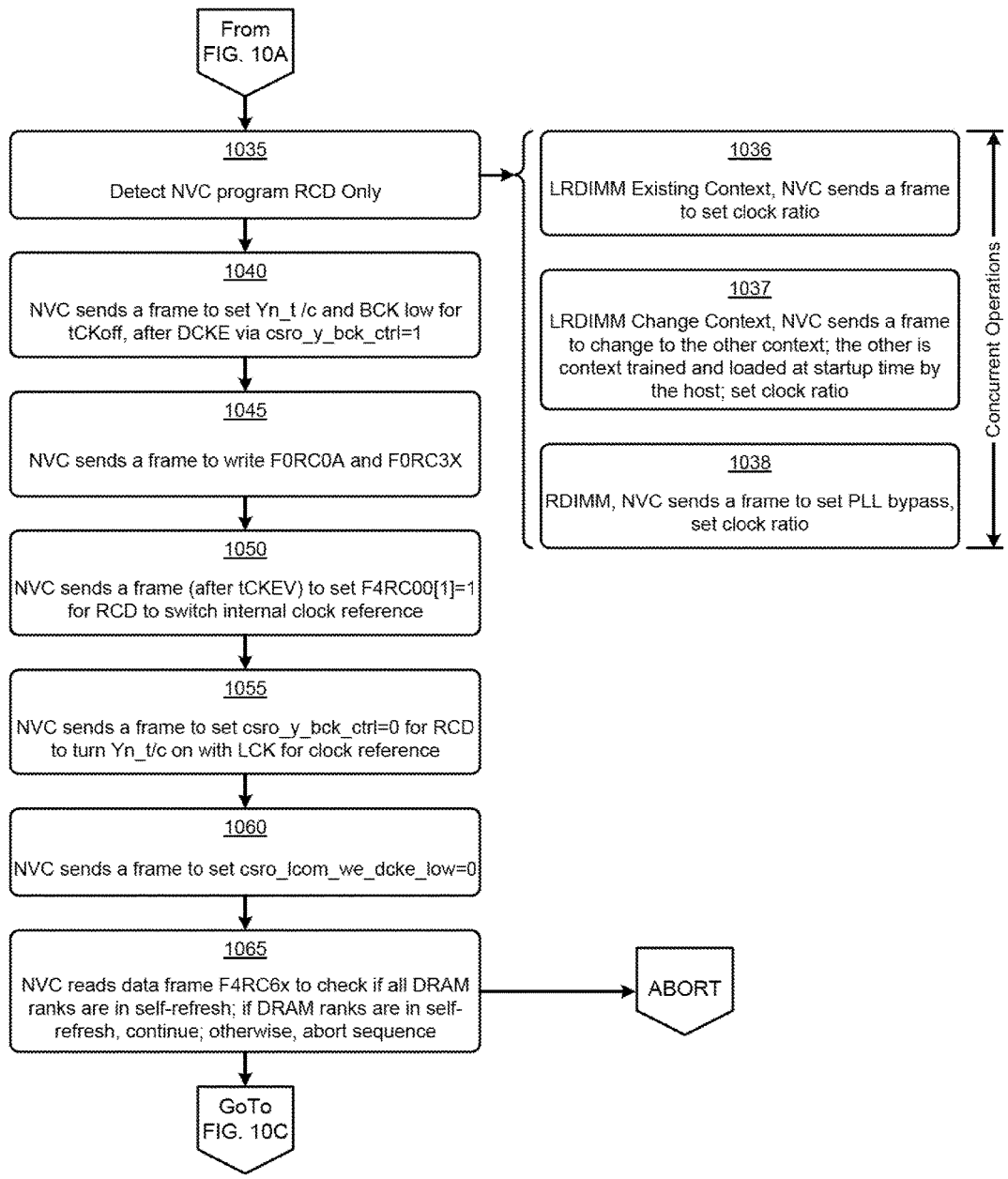
Figure 10C:
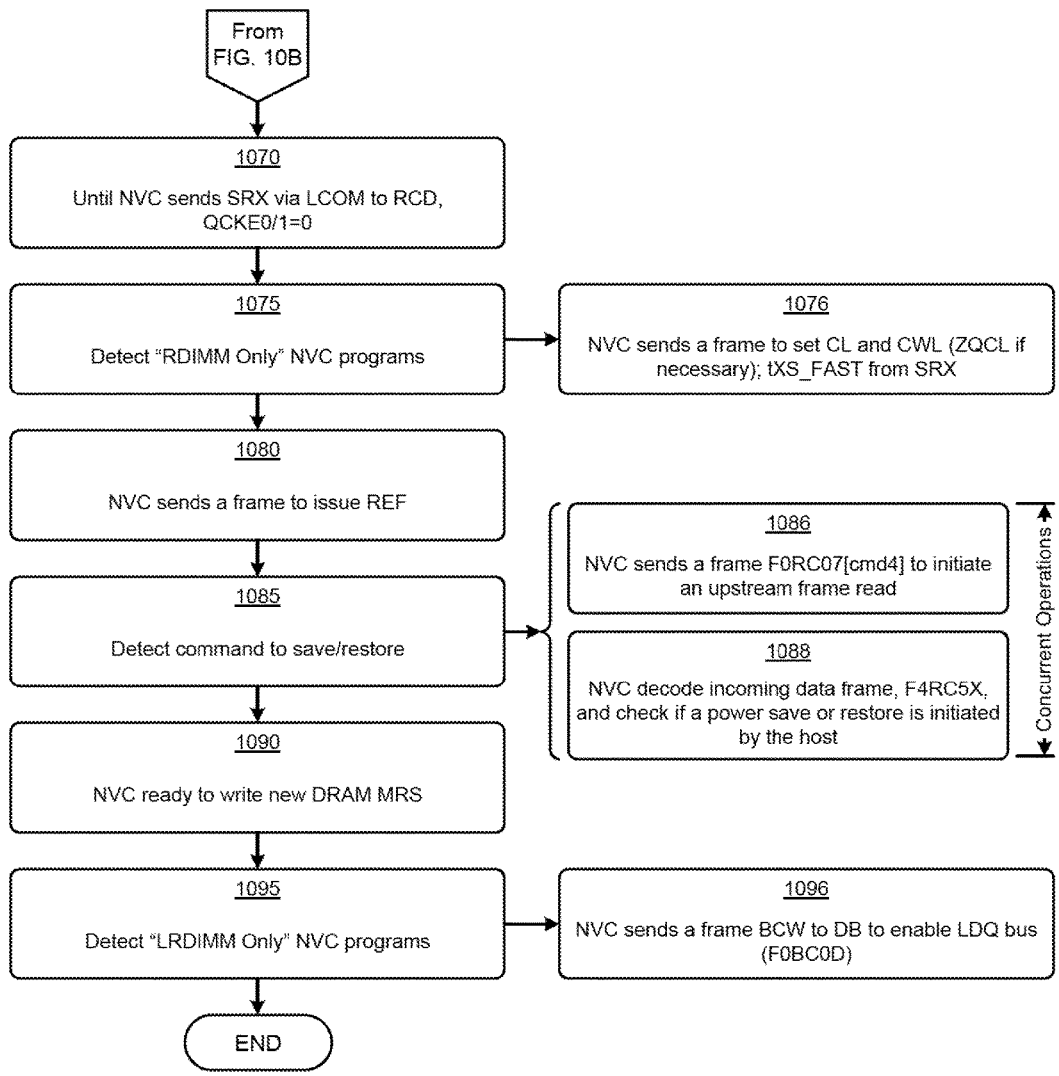

FIG. 10A, FIG. 10B, and FIG. 10C present clock transition and disconnection steps taken to enter a fully-autonomous flow as used to implement a fully-autonomous non-volatile memory controller. As an option, one or more instances of fully-autonomous flows or any aspect thereof may be implemented in the context of the architecture and functionality of the embodiments described herein. Also, the fully-autonomous flows or any aspect thereof may be implemented in any desired environment.

As shown, the NVC sends a command frame to assert CKE and CS_n high to put DRAM for all ranks in idle state. This step puts the DRAM in all ranks in idle state to address the case if DRAM were in SRE or PDE modes (see step 1005). Next, detect presence of LRDIMM-only NVC programs 1010 and, if so, the NVC sends a command frame BCW to DB to write F0BC0A and F0BC6X (see step 1012).

Continuing, the NVC sends a command frame to issue PREA to all ranks (see step 1015).

Next, detect presence of RDIMM-only NVC programs (see step 1020). If so the NVC sends a command frame to set MR1[A0]=0 to set DLL OFF mode (see step 1022). Then, the NVC sends a command frame to issue SRE to all ranks. This puts DRAM in self-refresh while programming RCD so that the DRAM does not lose content if the issue SRE to all ranks or other procedures take a long time (see step 1025). Set RCD internal DCKE=0 due to SRE, and set BCKE and QCKE0/1=0 (see step 1026).

At this point in the flow, DB is in a power down mode and the RCD cannot insert DCKE=1 or it will result in BCKE=1 which takes the DB out of power down mode. The NVC sends a command frame to set csro_lcom_we_dcke_low=1 to enable RCD MRS7 writes with DCKE=0. In some cases this step is not necessary, for example, in some vendor-specific cases. The NVC can write RCD with LCOM CKE=0 (see step 1030).

As shown in FIG. 10B, processing continues so as to detect NVC programs for RCD (see step 1035). If present, then:

capture the LRDIMM's existing context; NVC sends a command frame to set clock ratio (see step 1036);

enter routine for LRDIMM change context; the NVC sends a command frame to change to a new context (see step 1037); and for RDIMMs, the NVC sends a command frame to set PLL bypass, and sets clock ratio (see step 1038).

Continuing, the NVC sends a command frame to set Yn_t/c and BCK low for tCKoff, after DCKE via csro_y_b-ck_ctrl=1. (see step 1040). Then the NVC sends a command frame to write F0RC0A and F0RC3X. In some embodiments this step might not be performed, for example if the RCD implementation does not use the mentioned registers (see step 1045). The NVC sends a command frame (after tCKEV) to set F4RC00[1]=1 for RCD to switch internal clock reference (see step 1050), followed by sending a command frame to set csro_y_bck_ctrl=0 for RCD to turn Yn_t/c on with LCK for clock reference (see step 1055). The NVC sends a command frame to set csro_lcom_we_dcke_low=0 (see step 1060), then the NVC reads frame F4RC6x to check if all DRAM ranks are in self-refresh. If DRAM ranks are in self-refresh, continue; otherwise, abort this sequence (see step 1065).

As shown in FIG. 10C, if the sequence continues (e.g., did not abort after step 1065), then wait until NVC sends SRX via LCOM to RCD, QCKE0/1=0. Note that NVC sends a command frame to issue SRX to turn on BCK and QCKE0 high; RCD and DB new settings takes into an effect. This step can be used in many configuration, such as in single rank configurations (see step 1070).

Detect RDIMM-only NVC programs (see step 1075). If so, then NVC sends a command frame to set CL and CWL (ZQCL if necessary). Get tXS_FAST from SRX (see step 1076). NVC sends a command frame to issue REF (see step 1080).

Detect command for save/restore capability (see step 1085). If so, then NVC sends a command frame F0RC07 [cmd4] to initiate an upstream frame read (see step 1086), and then the NVC decodes incoming frame, F4RC5X, and checks if a power save or restore commands are initiated by the host (see step 1088).

Continuing, enter state where NVC is ready to write new DRAM MRS (see step 1090). Detect LRDIMM-only NVC programs (see step 1095). If so, then NVC sends a command frame BCW to DB to enable LDQ bus (F0BC0D) (see step 1096), else go to END.

Figure 11:
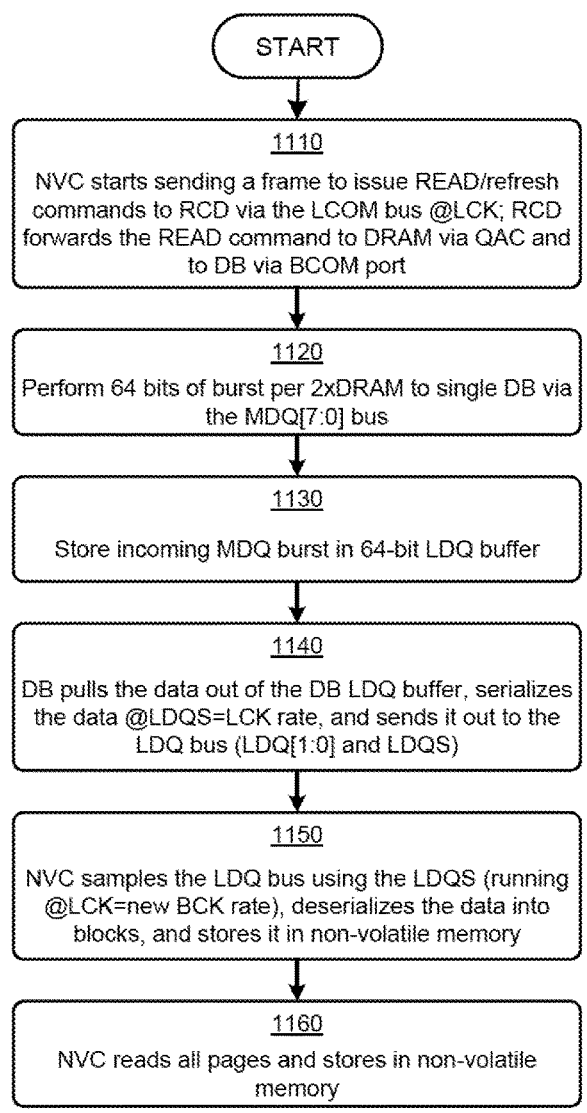
FIG. 11 presents a series of steps taken to perform a fully-autonomous save operation using a fully-autonomous non-volatile memory controller, according to some embodiments.

FIG. 11 presents a series of steps taken to perform a fully-autonomous save operation 1100 using a fully-autonomous non-volatile memory controller. As an option, one or more instances of fully-autonomous save 1100 or any aspect thereof may be implemented in the context of the architecture and functionality of the embodiments described herein. Also, the fully-autonomous save 1100 or any aspect thereof may be implemented in any desired environment.

As shown in FIG. 11, the fully-autonomous save begins when the NVC starts sending a command frame to issue READ/refresh commands to RCD via the LCOM bus @LCK. The RCD forwards the READ command to DRAM via QAC and to DB via BCOM port (see step 1110).

Perform 64 bit bursts per 2xDRAM to single DB via the MDQ[7:0] bus (see step 1120). The DB stores the incoming MDQ burst in 64-bit LDQ buffer (see step 1130), then the DB pulls the data out of the DB LDQ buffer, serializes the data @LDQS=LCK rate, and sends it out to the LDQ bus (LDQ[1:0] and LDQS) (see step 1140). The NVC samples the LDQ bus using the LDQS (running @LCK=new BCK rate), then the NVC deserializer the data into blocks and stores it in non-volatile memory (see step 1150). This continues such that the NVC reads all volatile memory pages and stores the page data in non-volatile memory. In some cases, not all volatile memory pages are accessed, instead only a selected set of pages are stored. Alternatively, the NVC can store only a configurable size or range of pages to non-volatile storage (see step 1160).

ADDITIONAL EMBODIMENTS OF THE DISCLOSURE

Figure 12:
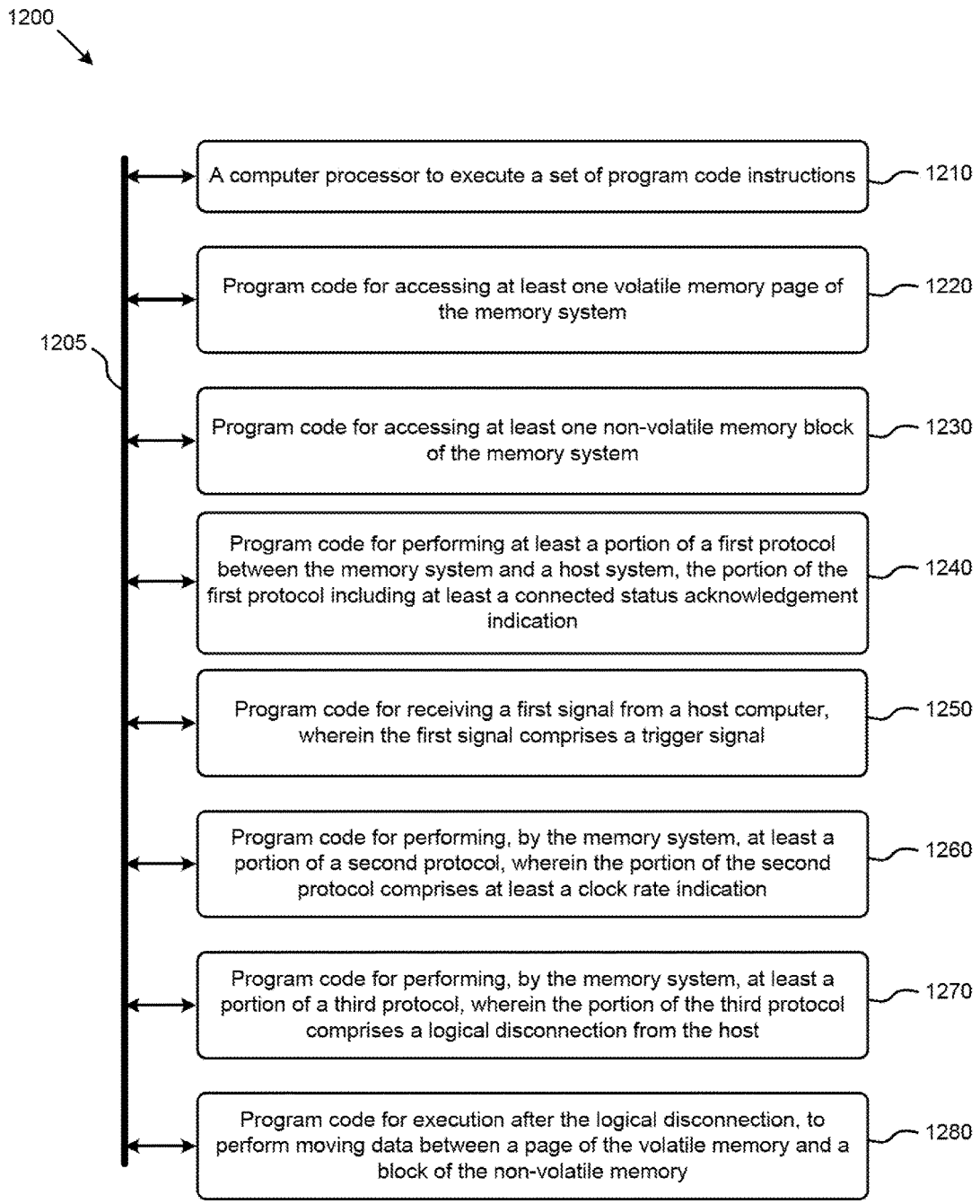
FIG. 12 is a block diagram of a system for a fully-autonomous non-volatile memory controller, according to an embodiment.

FIG. 12 is a block diagram of a system for hybrid memory systems for autonomous non-volatile memory save and restore operations, according to some embodiments. As an option, the system 1200 may be implemented in the context of the architecture and functionality of the embodiments described herein. Of course, however, the system 1200 or any operation therein may be carried out in any desired environment. The system 1200 comprises at least one processor and at least one memory, the memory serving to store program instructions corresponding to the operations of the system. As shown, an operation can be implemented in whole or in part using program instructions accessible by a module. The modules are connected to a communication path 1205, and any operation can communicate with other operations over communication path 1205. The modules of the system can, individually or in combination, perform method operations within system 1200. Any operations performed within system 1200 may be performed in any order unless as may be specified in the claims. The shown embodiment implements a portion of a computer system, presented as system 1200, comprising a computer processor to execute a set of program code instructions (see module 1210) and modules for accessing memory to hold program code instructions to perform: accessing at least one volatile memory page of the memory system (see module 1220); accessing at least one non-volatile memory block of the memory system (see module 1230); performing at least a portion of a first protocol between the memory system and a host system, the portion of the first protocol including at least a connected status acknowledgement indication (see module 1240); receiving, by a component of the memory system, a first signal from a host computer, wherein the first signal comprises a trigger signal (see module 1250); performing, by the memory system, at least a portion of a second protocol, wherein the portion of the second protocol comprises at least a clock rate indication (see module 1260); performing, by the memory system, at least a portion of a third protocol, wherein the portion of the third protocol comprises a logical disconnection from the host (see module 1270); and after the logical disconnection, moving or copying data to/from a page of the volatile memory to/from a block of the non-volatile memory (see module 1280).

Additional Examples

It should be noted that there are alternative ways of implementing the embodiments disclosed herein. Accordingly, the embodiments and examples presented herein are to be considered as illustrative and not restrictive, and the claims are not to be limited to the details given herein, but may be modified within the scope and equivalents thereof.

Additional System Architecture Examples

Figure 13:
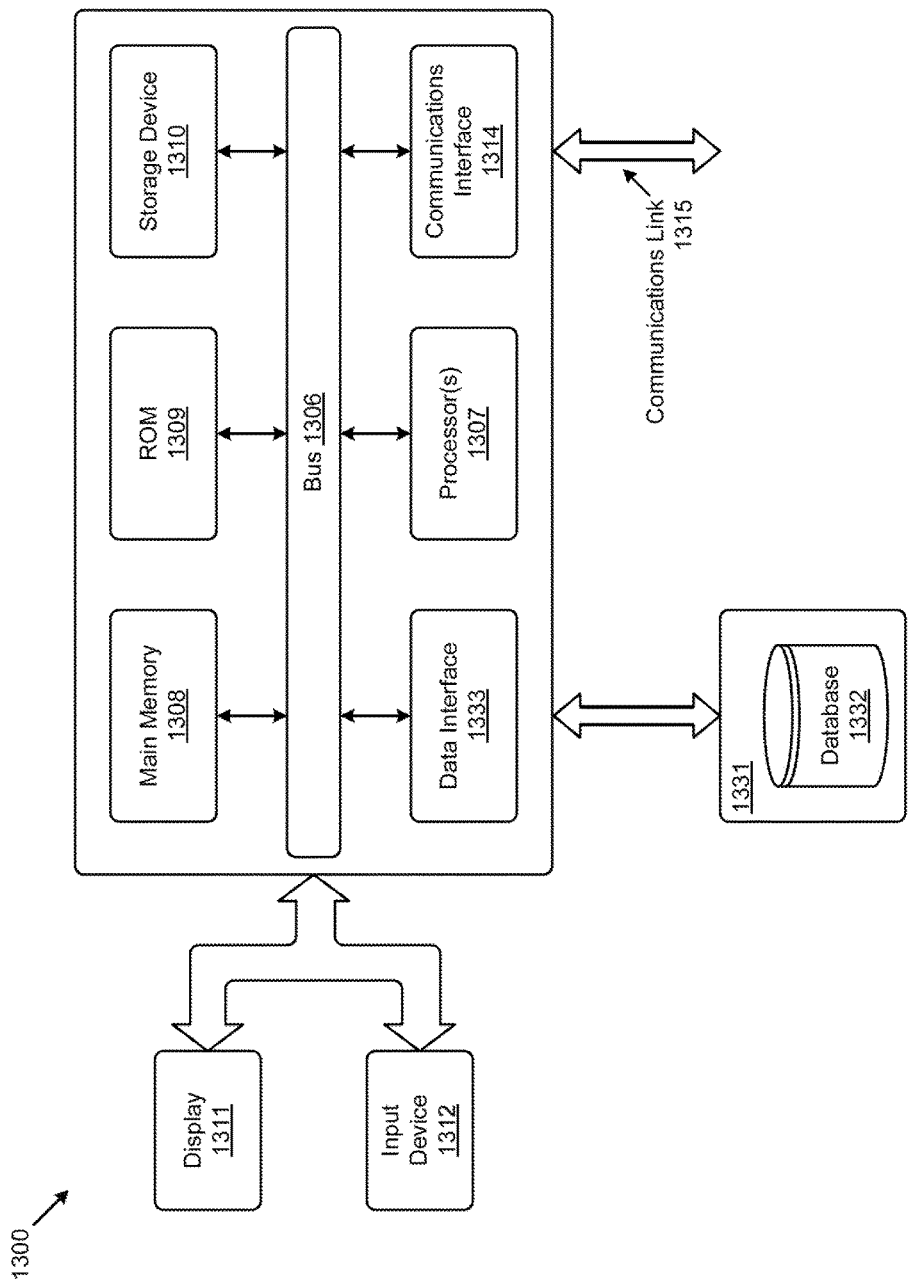
FIG. 13 depicts a block diagram of an instance of a computer system suitable for implementing embodiments of the present disclosure.

FIG. 13 depicts a block diagram of an instance of a computer system 1300 suitable for implementing embodiments of the present disclosure. Computer system 1300 includes a bus 1306 or other communication mechanism for communicating information, which interconnects subsystems and devices such as a processor 1307, a system memory (e.g., main memory 1308, or an area of random access memory (RAM)), a static storage device (e.g., ROM 1309), a storage device 1310 (e.g., magnetic or optical), a data interface 1333, a communication interface 1314 (e.g., modem or Ethernet card), a display 1311 (e.g., CRT or LCD), input devices 1312 (e.g., keyboard, cursor control, etc.), and an external data repository 1331.

According to one embodiment of the disclosure, computer system 1300 performs specific operations by processor 1307 executing one or more sequences of one or more instructions contained in system memory. Such instructions may be read into system memory from another computer readable/usable medium such as a static storage device or a disk drive. In alternative embodiments, hard-wired circuitry may be used in place of, or in combination with, software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media includes, for example, floppy disks, flexible disks, hard disks, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge; or any other non-transitory medium from which a computer can read data.

In an embodiment of the disclosure, execution of the sequences of instructions to practice the disclosure is performed by a single instance of the computer system 1300. According to certain embodiments of the disclosure, two or more instances of computer system 1300 coupled by a communications link 1315 (e.g., LAN, PTSN, or wireless network) may perform the sequence of instructions required to practice the disclosure in coordination with one another.

Computer system 1300 may transmit and receive messages, data and instructions, including programs (e.g., application code), through communications link 1315 and communication interface 1314. Received program code may be executed by processor 1307 as it is received and/or stored in storage device 1310 or any other non-volatile storage for later execution. Computer system 1300 may communicate through a data interface 1333 to a database 1332 on an external data repository 1331. Data items in database 1332 can be accessed using a primary key (e.g., a relational database primary key). A module as used herein can be implemented using any mix of any portions of the system memory and any extent of hard-wired circuitry including hard-wired circuitry embodied as a processor 1307.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A memory system receiving one or more host commands from a host memory controller, the memory system comprising:
    at least one command buffer coupled to the host memory controller to receive the one or more host commands from the host memory controller;
    at least one non-volatile memory controller coupled to the at least one command buffer to issue one or more local commands to the at least one command buffer; and
    a command sequence processor at the at least one non-volatile memory controller to issue at least one command sequence to the at least one command buffer responsive to receiving at least one trigger signal.

2. The memory system of claim 1, further comprising a sequence processor to control execution of the at least one command sequence.

3. The memory system of claim 2, wherein the sequence processor invokes the execution of the at least one command sequence.

4. The memory system of claim 2, wherein the sequence processor generates an interrupt signal when the at least one command sequence has finished executing.

5. The memory system of claim 1, further comprising a command queue to store the at least one command sequence.

6. The memory system of claim 5, wherein the at least one command sequence is stored in the command queue responsive to a firmware update.

7. The memory system of claim 1, wherein the at least one command sequence is selected based at least in part on a trigger source of the at least one trigger signal.

8. The memory system of claim 1, wherein the at least one command sequence is selected based at least in part on a set of zone mapping data.

9. The memory system of claim 8, wherein the zone mapping data characterizes a relationship between the at least one trigger signal and the at least one command sequence.

10. The memory system of claim 1, further comprising a response buffer to store response data for access by the command sequence processor.

11. The memory system of claim 10, wherein the response data comprises the at least one trigger signal.

12. The memory system of claim 1, wherein the at least one command sequence comprises one or more of the one or more local commands.

13. The memory system of claim 1, wherein the at least one command sequence is received by the at least one command buffer concurrently with at least one of the one or more host commands.

14. The memory system of claim 1, wherein the at least one command sequence is executed asynchronously to at least one of, the one or more host commands, or one or more local responses from the at least one command buffer.

15. The memory system of claim 1, wherein at least a portion of the at least one command sequence accesses one or more control setting registers on the at least one command buffer.

16. The memory system of claim 1, wherein the at least one command sequence performs at least one of, a normal mode operation, a transition trigger operation, a transition clock switch operation, a data save operation, a data restore operation, a disable host command operation, a disable host clock operation, or a wait operation.

17. The memory system of claim 1, wherein the at least one trigger signal corresponds to at least one of, power fail monitor trigger, a save event, a backup event, a restore event, a register value, or a control setting register access event.

18. The memory system of claim 1, further comprising one or more dynamic random access memory (DRAM) devices, wherein the command sequence comprises at least one DRAM command to operate on at least one of the one or more DRAM devices.

19. The memory system of claim 1, further comprising one or more flash memory devices.

* * * * *